(12) United States Patent　　(10) Patent No.:　　US 9,749,282 B2
Jain et al.　　(45) Date of Patent:　　Aug. 29, 2017

(54) ELECTRONIC DEVICE AND METHODS OF UPDATING AND MANAGING APPLICATION STATUS INFORMATION IN THE ELECTRONIC DEVICE

(71) Applicant: SAMSUNG ELECTRONICS CO., LTD., Suwon-si (KR)

(72) Inventors: Arihant Jain, Noida (IN); Deepak Jain, Noida (IN); Shivsharad Dhiman, Noida (IN); Vishal Bhatnagar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 14/321,168

(22) Filed: Jul. 1, 2014

(65) Prior Publication Data

US 2015/0006638 A1　　Jan. 1, 2015

(30) Foreign Application Priority Data

Jul. 1, 2013　　(IN) .......................... 2899/CHE/2013
Nov. 29, 2013　　(KR) ........................ 10-2013-0147985

(51) Int. Cl.
*G06F 15/16*　　(2006.01)
*H04L 12/58*　　(2006.01)
(Continued)

(52) U.S. Cl.
CPC ............. *H04L 51/32* (2013.01); *G06Q 10/10* (2013.01); *H04L 51/043* (2013.01);
(Continued)

(58) Field of Classification Search
CPC .... H04W 4/12; G06Q 10/10; H04M 1/72566; H04M 1/72597; H04M 1/72572
(Continued)

(56) References Cited

U.S. PATENT DOCUMENTS 7,252,265 B2　　8/2007　　Perlo et al.
8,212,521 B2　　7/2012　　Choi
(Continued)

FOREIGN PATENT DOCUMENTS

JP　　2008-68711 A　　3/2008
KR　　2011-205196 A　　10/2011
KR　　10-2013-0050452 A　　5/2013

OTHER PUBLICATIONS

Communication dated Sep. 30, 2014 issued by the International Searching Authority in counterpart Korean Patent Application No. PCT/KR2014/005473.
(Continued)

*Primary Examiner* — Kyung H Shin
(74) *Attorney, Agent, or Firm* — Sughrue Mion, PLLC

(57) ABSTRACT

Provided are an electronic device and methods of updating and managing application status information of an application in the electronic device. The method of updating application status information in an electronic device may include detecting a change from first device status information to second device status information from among a plurality of device status information settings stored in the electronic device; and updating application status information of at least one application mapped to the second status information.

27 Claims, 18 Drawing Sheets

(51) Int. Cl.
*G06Q 10/10* (2012.01)
*H04W 4/12* (2009.01)
*H04M 1/725* (2006.01)

(52) U.S. Cl.
CPC ... *H04M 1/72566* (2013.01); *H04M 1/72572* (2013.01); *H04M 1/72597* (2013.01); *H04W 4/12* (2013.01)

(58) Field of Classification Search
USPC .............................. 709/204, 206; 455/550.1
See application file for complete search history.

(56) References Cited

U.S. PATENT DOCUMENTS

| | | |
|---|---|---|
| 8,265,595 B1 | 9/2012 | Reeves et al. |
| 2007/0275745 A1 | 11/2007 | Owen |
| 2009/0253454 A1* | 10/2009 | Sampson .......... H04M 1/72566 455/550.1 |
| 2010/0191831 A1 | 7/2010 | Moon et al. |
| 2011/0047184 A1 | 2/2011 | Lee et al. |
| 2012/0009900 A1 | 1/2012 | Chawla |
| 2012/0158943 A1 | 6/2012 | Esteve Balducci et al. |
| 2013/0111365 A1 | 5/2013 | Chen et al. |
| 2013/0238723 A1* | 9/2013 | Balannik ................ H04W 4/12 709/206 |

OTHER PUBLICATIONS

Communication dated Feb. 6, 2017 by the European Patent Office in European Patent Application No. 14820587.5.

* cited by examiner

ELECTRONIC DEVICE AND METHODS OF UPDATING AND MANAGING APPLICATION STATUS INFORMATION IN THE ELECTRONIC DEVICE

CROSS-REFERENCE TO RELATED APPLICATIONS

This application claims priority from Indian Patent Application No. 2899/CHE/2013, filed on Jul. 1, 2013, in the Controller General of Patents Designs and Trademarks, and Korean Patent Application No. 10-2013-0147985, filed on Nov. 29, 2013, in the Korean Intellectual Property Office, the disclosures of which are incorporated herein in their entirety by reference.

BACKGROUND

1. Field

One or more exemplary embodiments relate to an electronic device and methods of updating and managing application status information of an application of the electronic device.

2. Description of the Related Art

The use of Internet-connected smart devices is increasing in everyday life. Examples of smart devices include a phone, a tablet, and a tab-phone, but are not limited thereto. Users may communicate with each other through a voice call, a video call, a chat messenger, or another communication application installed in their devices. Examples of the chat messenger include WhatsApp®, Samsung ChatOn®, Google Talk®, and EBuddy®, but are not limited thereto. Examples of a social application include Facebook® and Twitter®, but are not limited thereto.

A chat messenger or social application may display a status message related to a user. FIG. 1 illustrates default status messages of a social application 100. Examples of the default status messages include "Available" 102, "Busy" 104, "At School" 106, "Battery about to Die" 108, "Can't Talk, SMS Only" 110, "At Work" 112, "Out for Lunch" 114, and "At the Gym" 116, but are not limited thereto. A user may select at least one of the default status messages to be displayed to other contacts. A colored dot may be displayed together with each default status message. A color of the colored dot is based on a message to be transferred. Examples of the color include red, green, yellow, and orange, but are not limited thereto. For example, in the social application 100, "Available" 102 may be displayed with a green dot, "Busy" 104 may be displayed with a red dot, "At School" 106 may be displayed with a red dot, "Battery about to Die" 108 may be displayed with a red dot, and "Out for Lunch" 114 may be displayed with a yellow dot. "Can't Talk, SMS Only" 110, "At Work" 112, and "At the Gym" 116 are displayed in colored dots in similar manner.

FIG. 2 illustrates a plurality of contacts in a social application 200, wherein the contacts display different status messages. In FIG. 2, the contacts display status messages to be shown to other contacts. For example, a user may customize a status message "I feel Good", and the customized status message may be displayed to other contacts. A customized status message in the social application 200 may be manually changed by the user. In the social application 200, customized status messages 202, 204, 206, and 208 are displayed with suitably colored dots.

If a user wants to change a phone setting to adapt to an environment, a phone profile generally helps the user adjust ring volume, message notification volume, media volume, vibration, screen brightness, and turn on/off WiFi according to an environment. As such, the phone profile (e.g., a device profile) may include information configured to permit a user to adjust several features of the phone, such as a volume, vibration, brightness, or the like. Herein, the phone profile may also be referred to as device setting information or device status information.

Examples of a phone profile in a smart device include "General", "Meeting", "Silent", and "Outdoor", but are not limited thereto. When a phone profile of a user is "General" and a status message of the user in a social application is "Available", if the user has to attend a meeting, the user may change the phone profile to "Meeting" or "Silent". Here, status messages of the social application and other applications are maintained to be "Available". Thus, a friend of the user may initiate a conversation with the user expecting a response despite the user being in a meeting. At this time, the user may want the status message of the social application to be automatically updated with respect to the current phone profile.

In this regard, there is demand for methods and systems for effectively and automatically updating a status message of an online application based on a change of a phone profile, i.e., phone status information.

SUMMARY

One or more exemplary embodiments may include methods of updating and managing application status information of an application in an electronic device, and the electronic device.

Additional aspects will be set forth in part in the description which follows and, in part, will be apparent from the description, or may be learned by practice of the exemplary embodiments.

According to one or more exemplary embodiments, a method of updating application status information of an application in an electronic device may be provided, the method including: detecting a change from first device status information to second device status information from among a plurality of device status information settings stored in the electronic device, and updating application status information of at least one application mapped to the second device status information according to the detected change.

A detected change may include receiving, from a user of the electronic device, a selection to change from the first device status information to the second device status information.

Updating may include obtaining an application list of the at least one application mapped to the second device status information, obtaining information corresponding to the at least one application from the obtained application list, and updating application status information of the at least one application using the obtained information corresponding to the at least one application.

The information corresponding to the at least one application may include at least one of a status message, connectivity, notification, vibration, colors of dots, status of availability, and alarm of an application.

The at least one application may include a social application.

The first device status information may correspond to first phone status information and the second device status information may correspond to second phone status information.

According to one or more exemplary embodiments, a method of managing application status information of an application in an electronic device may be provided, the method including: generating a plurality of device status information settings, receiving a selection of at least one application to be mapped to each of the plurality of device status information settings, receiving application status information of an application corresponding to the at least one application mapped to each of the plurality of device status information settings, and storing the received application status information.

Each of the plurality of device status information settings may indicate one of a plurality of statuses corresponding to an environment of a user of the electronic device, and when mapped device status information indicates one of the plurality of statuses corresponding to the environment of the user, the application status information of the at least one application indicates status information to be displayed in the application when the user is in one of the plurality of statuses.

Generating the plurality of device status information settings may include generating the plurality of device status information settings by the electronic device according to a default setting, or by receiving the plurality of device status information settings from a user.

Generating the plurality of device status information settings may include preparing a device status information list in the electronic device and updating the device status information list based on at least one of detecting new device status information and detecting existing device status information.

Receiving a selection may include preparing an application list of application which are active, corresponding to at least one of the plurality of device status information settings, and providing a user interface configured to permit at least one of adding an application to the application list and deleting an application from the application list.

According to one or more exemplary embodiments, an electronic device for updating application status information of an application may be provided, the electronic device including: a memory for storing instructions; and a processor connected to the memory which executes the instructions to perform detecting a change from first device status information to second device status information from among a plurality of device status information settings stored in the electronic device, and updating application status information of at least one application mapped to the second device status information according to the detected change.

A processor of the electronic device may further execute instructions to perform receiving, from a user of the electronic device, a selection to change from the first device status information to the second device status information.

A processor of the electronic device may further execute instructions to perform obtaining an application list of the at least one application mapped to the second device status information, obtaining information corresponding to the at least one application form the obtained list, and communicating with a server of the at least one application to update application status information of the at least one application by using the obtained information corresponding to the at least one application.

The information corresponding to the at least one application may comprise at least one of a status message, connectivity, notification, vibration, colors of dots, status of availability, and alarm of an application.

The at least one application may comprise a social application.

According to one or more exemplary embodiments, an electronic device for managing application status information of an application may be provided, the electronic device including: a memory for storing instructions; and a processor connected to the memory which executes the instructions to perform generating a plurality of device status information settings, receiving a selection of at least one application to be mapped to each of the plurality of device status information settings, receiving application status information of an application corresponding to the at least one application mapped to each of the plurality of device status information, and storing the received application status information.

Each of the plurality of device status information settings may indicate one of a plurality of statuses corresponding to an environment of a user of the electronic device, and when mapped device status information indicates one of the plurality of statuses corresponding to the environment of the user, the application status information of the at least one application indicates status information to be displayed in the application when the user is in the one of the plurality of statuses.

A processor of the electronic device may further execute instructions to perform generating the plurality of device status information settings according to a default setting, or receiving the plurality of device status information settings from a user.

A processor of the electronic device may further execute instructions to perform generating the plurality of device status information settings, preparing a device status information list in the electronic device, and updating the device status information list based on at least one of detecting new device status information and detecting existing device status information.

A processor of the electronic device may further execute instructions to perform preparing an application list of application active with respect to at least one of the plurality of device status information settings when the selection of the at least one application is received, and providing a user interface configured to permit at least one of adding an application to the application list and deleting an application from the application list.

According to one or more exemplary embodiments, a computer-readable recording medium may have recorded thereon a program for executing the methods above.

According to one or more exemplary embodiments, an electronic device may be provided, which includes a storage configured to store mapping information which maps between a status of the electric device and at least one application, a receiver configured to receive a changed electronic device status, and a transmitter configured to transmit a first message corresponding to mapping information of the changed electronic device status and status of a first application corresponding to the changed electronic device status, and configured to transmit a second message corresponding to mapping information of the changed electronic device status and status of a second application corresponding to the changed electronic device status.

The first message may be transmitted to a first application server and the second message may be transmitted to a second application server.

The first message may include information indicating a user of the electronic device and first application status information, and the second message may include information indicating the user of the electronic device and second application status information.

The mapping information may be provided by default by the electronic device.

The mapping information may be provided by a user of the electronic device.

An application mapper may be configured to receive mapping information from the user and cause the storage to store the received mapping information.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1:
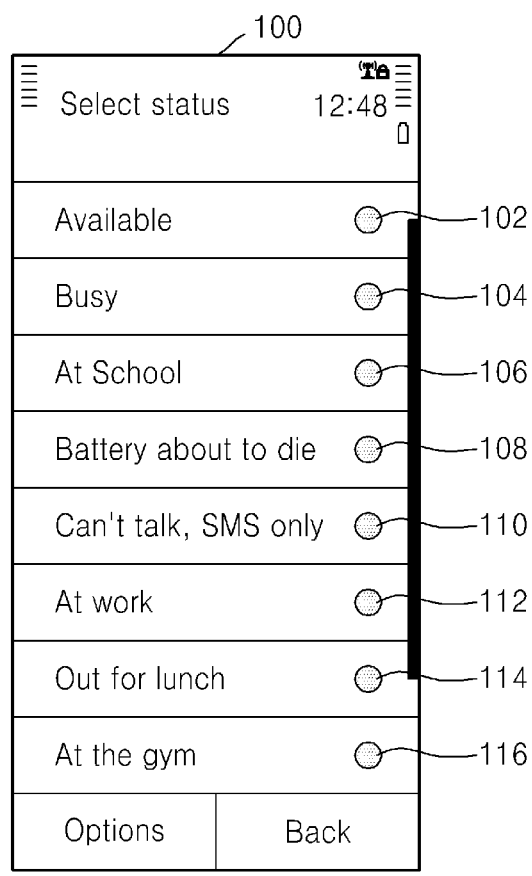
FIG. 1 illustrates default status messages of a social application.
Figure 2:
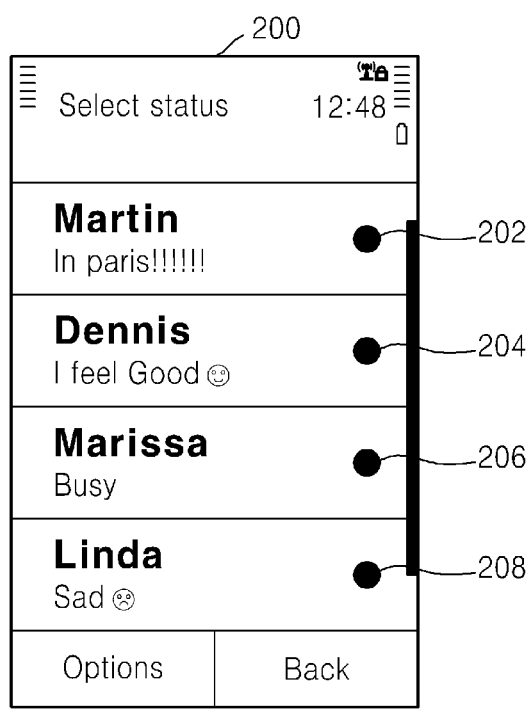
FIG. 2 illustrates a plurality of contacts in a social application, wherein the contacts display different status messages.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

One or more exemplary embodiments provide a method and apparatus for automatically updating and managing application status information of a social application based on detecting a change of device status information (e.g., phone status information). For example, when the device status information changes from "General" to "Meeting", a status and a setting of the social application are updated accordingly.

Figure 3:
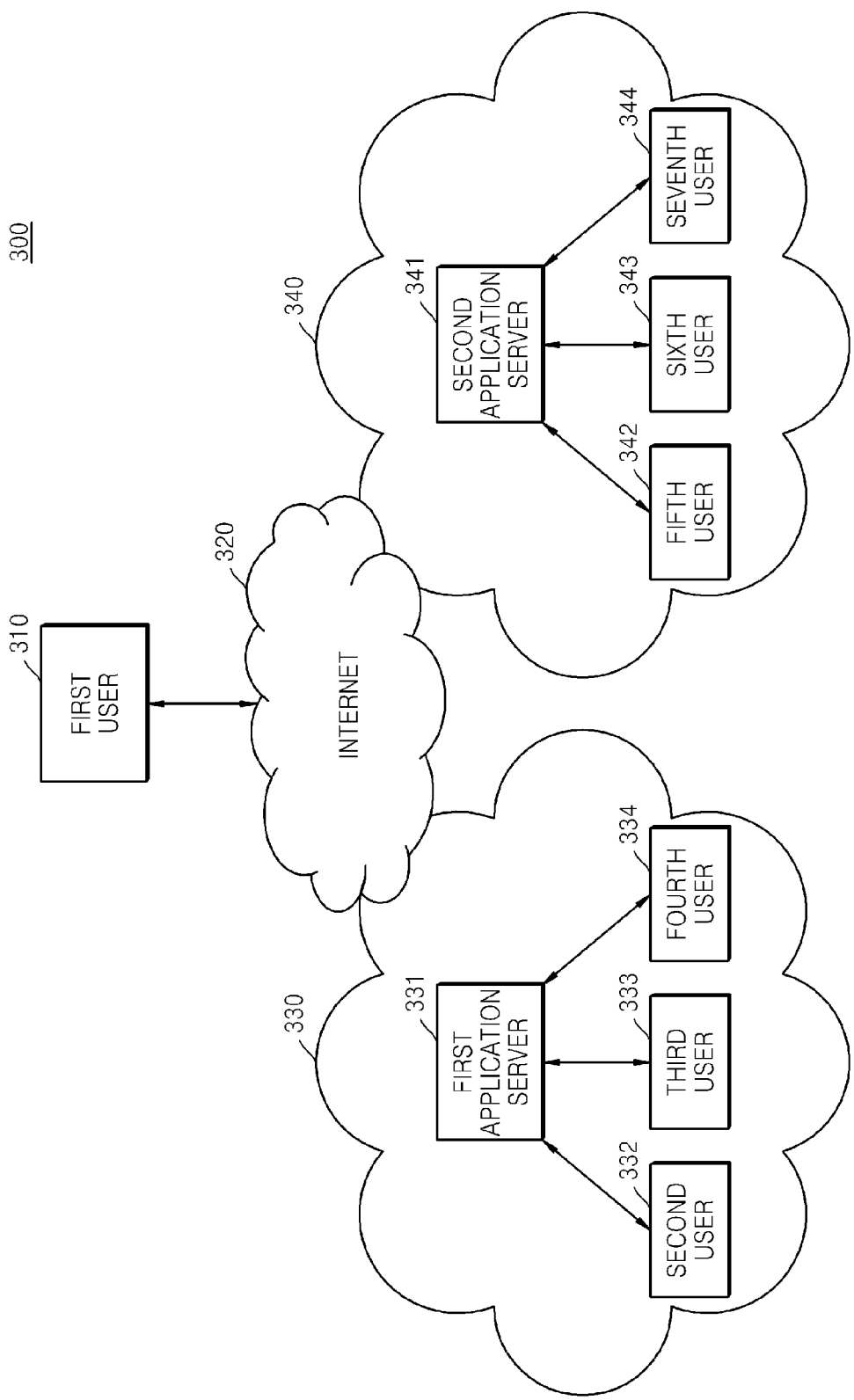
FIG. 3 is a block diagram of an environment to which a method of automatically updating application status information of a social application based on detecting a change of device status information is applied, according to an exemplary embodiment.

FIG. 3 is a block diagram of an environment 300 to which a method of automatically updating application status information of a social application based on detecting a change of device status information (e.g., phone status information) is applied according to an exemplary embodiment.

Referring to FIG. 3, the environment 300 may include a first user 310, the Internet 320, a first application environment 330, and a second application environment 340.

The first user 310 may include an electronic device used by the first user 310. Examples of the electronic device include a smart phone, a mobile phone, a laptop, a personal digital assistant (PDA), a tablet, and a smart TV, but are not limited thereto as long as the electronic device is capable of communicating with another device through a network.

According to an exemplary embodiment, the electronic device may be a mobile phone. The mobile phone may be connected to the Internet 320 via a network operator or another Internet source. The mobile phone may communicate with a first application server 331 and a second application server 341 through the Internet 320 via the network operator or the other Internet source.

The first application environment 330 may include the first application server 331, a second user 332, a third user 333, and a fourth user 334. The first application server 331 may be a software framework or physical server for providing effective execution of a procedure supporting a first application. The second through fourth users 332 through 334 are examples, and a user using the first application is not limited thereto.

The second application environment 340 may include the second application server 341, a fifth user 342, a sixth user 343, and a seventh user 344. The second application server 341 may be a software framework or physical server for providing effective execution of a procedure supporting a second application. The fifth through seventh users 342 through 344 are only examples, and a user using the second application is not limited thereto.

In the first application environment 330, the first or second application may be a messenger application enabling a user to communicate with another user, to transmit a message to the other user, or to chat with another user. The first or second application may also be, for example, a social application enabling a user to present his/her webpage to another user. The messenger and social applications are commonly referred to as an application herein.

When the first user 310 using the first application sets a status message in the first application, information including the status message may be transmitted to the first application server 331 and other users. For example, the second through fourth users 332 through 334 may view the status message set by the first user 310 using the first application.

Similarly, when the first user 310 also uses the second application and sets a status message in the second application, set information including the status message may be transmitted to the second application server 341, and other users. For example, the fifth through seventh users 342 through 344 may view the status message set by the first user 310 using the second application.

According to an exemplary embodiment, the first user 310 may set a plurality of device status information settings and may map at least one application to each of the plurality of device status information settings. Then, a status message to be used as application status information for each application which corresponds to the mapped application may be set.

Also, according to an exemplary embodiment, when the first user 310 changes first device status information (e.g., first phone status information) to second device status information (e.g., second phone status information) from among the plurality of device status information settings, application status information of at least one application mapped to the second device status information is set by using a status message corresponding to the at least one application mapped to the second device status information.

Herein, device status information (e.g., phone status information) may be set by the first user 310 on his/her electronic device or mobile phone, and may permit flexible use the electronic device according to his/her status. For example, when his/her status is available, the first user 310 may set device status information (e.g., phone status information) such that a volume or message notification sound is set to be normal. Also, when his/her status is in a meeting, the first user 310 may set device status information such that a volume or message notification sound is set to silent or very low. By pre-setting device status information as such, the first user 310 may adaptively use the mobile phone according to his/her environment by only changing the device phone status information without having to set the volume or message notification sound every time his/her environment changes.

Herein, application status information is a message or information for showing a status of the first user 310 to other users using the same application. Users may use a plurality of applications in their electronic devices, and may wish to use different application status information for each of the plurality of applications. Also, the users may wish to modify application status information in one application according to their environment.

According to an exemplary embodiment, the first user 310 may specify a plurality of device status information settings (e.g., phone status information settings), and may also interconnect and set information or a message to be used as application status information corresponding to each device status information setting. Accordingly, application status information may be changed automatically when the first user 310 changes the device status information.

Figure 4:
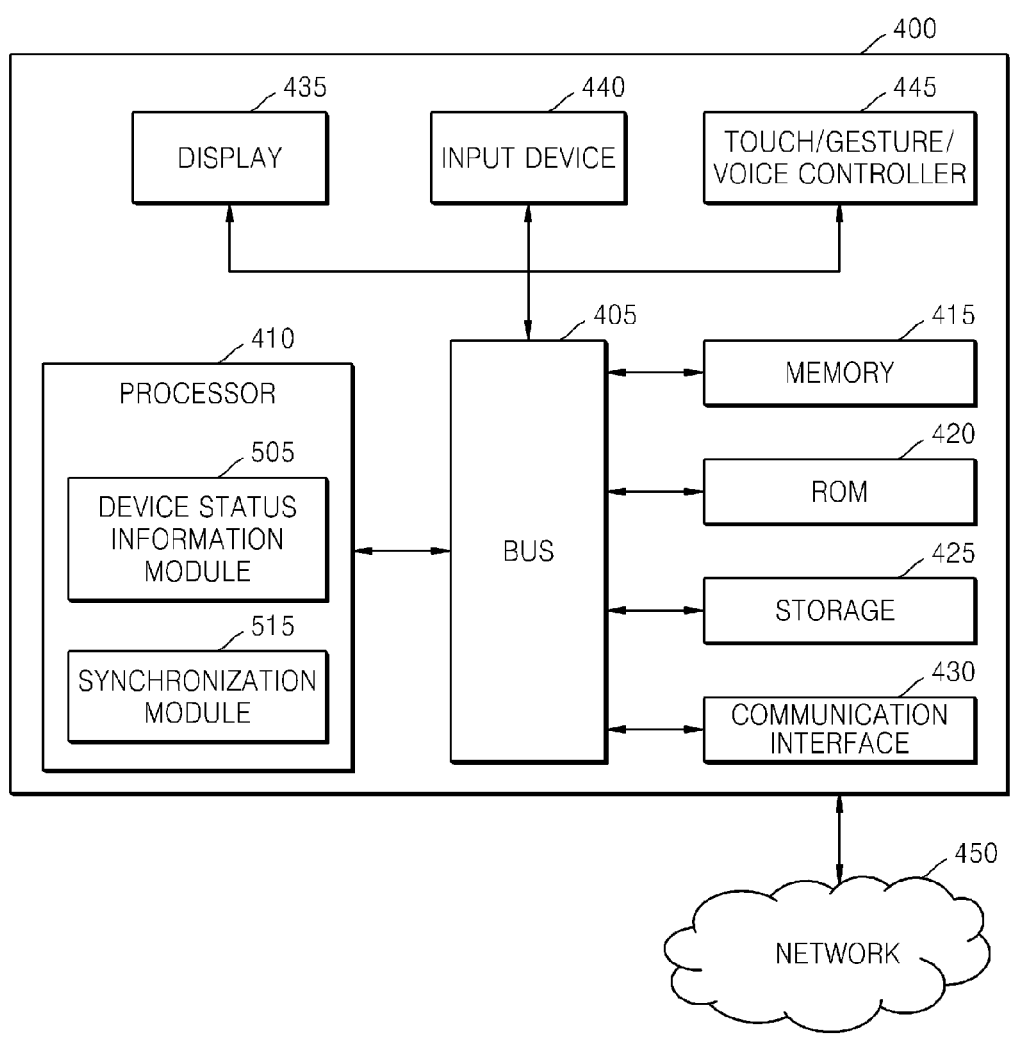
FIG. 4 is a block diagram of an electronic device according to an exemplary embodiment.

FIG. 4 is a block diagram of an electronic device 400 according to an exemplary embodiment.

Referring to FIG. 4, the electronic device 400 may include a bus 405, a processor 410, a memory 415, read only memory (ROM) 420, a storage unit 425, a communication interface 430, a display unit 435, an input device 440, and a touch/gesture/voice controller 445.

The electronic device 400 may include the bus 405 or a different communication system to transfer information.

The electronic device 400 may include the processor 410 being connected to the bus 405. The processor 410 may include an electronic integrated circuit (IC) for processing and controlling functions of the electronic device 400.

The electronic device 400 may also include the memory 415 (for example, random access memory (RAM) or another dynamic storage device) that is connected to the bus 405, wherein the memory 415 stores information usable by the processor 410. The memory 415 may be used to store any required temporary information.

The electronic device 400 may include the ROM 420 that is connected to the bus 405 and storing static information for the processor 410, or another static storage device. Also, the electronic device 400 may include the storage unit 425 (for example, a magnetic disk or optical disk) that is connected to the bus 405 and stores information.

The electronic device 400 may also include the communication interface 430 connected to the bus 405. The communication interface 430 may provide bidirectional communication by being connected to a network 450.

In order to display information, the electronic device 400 may include the display unit 435 (for example, a cathode ray tube (CRT), a light-emitting display (LED), or a liquid crystal display (LCD)) connected to the bus 405.

The input device 440, including alphabet keys, number keys, and other keys, may be connected to the bus 405 to transmit an input to the processor 410. The input device 440 may be included in the electronic device 400. Another type of user input device may be the touch/gesture/voice controller 445 for swipe, pattern, voice recognition, or a cursor direction key for transmitting an input to the processor 410 and controlling cursor movement on the display unit 435. Alternatively, the input device 440 may be included in the display unit 435, for example as a touch screen.

Various exemplary embodiments are related to using the electronic device 400 in order to realize technologies described herein. According to an exemplary embodiment, the processor 410 may perform the method by using information included in the memory 415. The information may be read from another device-readable medium (such as the storage unit 425) to the memory 415. An instruction may be stored in the memory 415.

Herein, the term "device-readable medium" denotes any medium that participates in providing data so that a device operates in a certain manner. According to an exemplary embodiment realized by using the electronic device 400, various device-readable media may participate in providing information to the processor 410. The device-readable medium may be a storage medium. The storage medium may be a volatile or nonvolatile medium. Examples of the nonvolatile medium include optical and magnetic disks, such as the storage unit 425. Examples of the volatile memory include a dynamic memory, such as the memory 415. Such device-readable media may be tangible so as to detect information in a physical mechanism for reading information from a device.

The device-readable medium may generally include a magnetic medium such as a floppy disk, a flexible disk, a hard disk, or a magnetic tape, an optical medium such as a CD-ROM, a physical medium such as a punch card, paper tape, or another physical medium including a pattern of holes, a memory chip or cartridge, such as random access memory (RAM), programmable read only memory (PROM), erasable PROM (EPROM), or flash-EPROM. Alternatively, the device-readable medium may be a transmission medium including a coaxial cable, a copper wire, and an optical fiber, or a transmission medium including a wire (including the bus 405). The transmission medium may have a form of radio waves and audio or an optical wave generated during infrared data communication.

The processor 410 may include a device status information module 505 and a synchronization module 515 to perform the method. The device status information module 505 and the synchronization module 505 will be described in detail with reference to FIG. 5.

Figure 5:
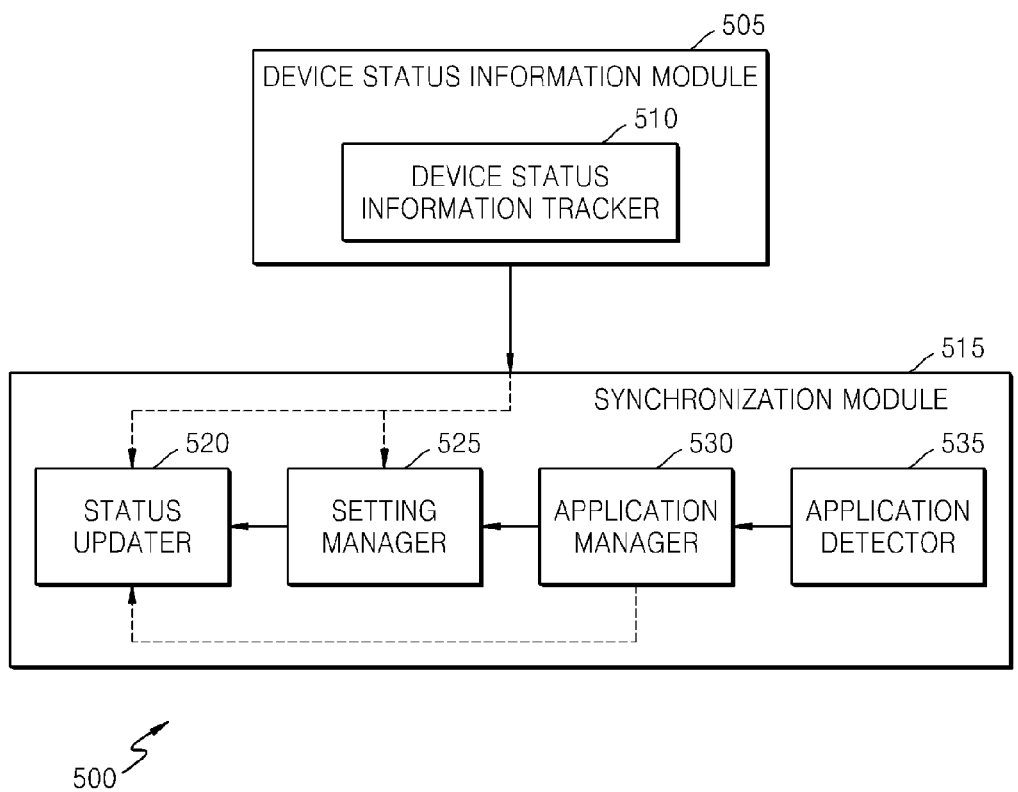
FIG. 5 is a detailed block diagram of a processor of FIG. 4.

FIG. 5 is a detailed block diagram of the processor 410 of FIG. 4.

Referring to FIG. 5, the processor 410 (shown as element 500 of FIG. 5) may include the device status information module 505 and the synchronization module 515. The device status information module 505 may include a device status information tracker 510.

The device status information tracker 510 detects device status information in an electronic device, such as a mobile phone. Examples of the device status information in the mobile phone include 'General', 'Silent', 'Discrete', 'Meeting', 'Party', 'Outdoor', and 'Sleeping', but are not limited thereto. A user may generate new device status information (e.g., new phone status information) based on his/her preference. The device status information tracker 510 may generate a device status information list of device status information. The device status information tracker 510 may notify current device status information and a change of device status information to various modules. An example of the change of device status information includes a change from 'General' to 'Meeting' or to 'Silent'.

The synchronization module 515 is realized in the electronic device to map at least one application setting to at least one device status information setting (e.g., phone status information setting). The synchronization module 515 may include a status updater 520, a setting manager 525, an application manager 530, and an application detector 535.

The application detector 535 may detect various applications installed in the electronic device. Examples of the several applications include a game, a network game, a utility application, a chatting messenger, and a social application, but are not limited thereto. As shown in Table 1, in an exemplary embodiment, the application detector 535 may generate an application list of all applications installed in the electronic device. Also, the application detector 535 may prepare a social application list. The social applications may be selected by the user, and the user may desire to apply device status information (e.g., phone status information) set by the user to the social applications. Here, if a multi-user game application or utility application is able to display a message showing a status corresponding to the user, the device status information set by the user may also be applied to the multi-user game application or utility application. For example, Table 1 below shows an exemplary application list according to an exemplary embodiment.

TABLE 1

| Social Application | Multi-user Game | Utility Application |
| --- | --- | --- |
| Gmail Chat | 3D home Run Battle | Stock Market |
| Facebook Chat | Poker | Best Property Deal |
| Samsung ChatOn | Need for Speed | Olx |
| WhatsApp | Tower of Power | Pizza Discount Offers |
| Twitter | | |
| Me2day | | |
| Add new app. | | |

Also, the application detector 535 may detect one of a newly installed application and a deleted application, and update the application list accordingly. If a new application is added, the application detector 535 may add a name of the new application to the application list, and enable a user to select an application for a social application list. Also, the application detector 535 may optimize the application list by suggesting in detail an application using Internet connection. The user may be given a choice of applying a filter to group applications into one of a chat messenger, a network application, an online game, and a utility application. Also, the user may give a name to a group generated based on the filter. In addition, the user may list the applications in the application list based on his/her priority, and a change of the applications may be applied accordingly.

The application manager 530 may map different applications to a device status information list (e.g., a phone status information list). Table 2 shows an exemplary embodiment illustrating how each device status information setting may be mapped to different applications.

TABLE 2

| Device Status information | Social Application | Multi-user Game | Utility Application |
| --- | --- | --- | --- |
| General | Gmail Chat | 3D Home Run Battle | Stock Market |
| | Facebook Chat | Poker | Best Property Deals |
| | Samsung ChatOn | Need for Speed | Olx |
| | WhatsApp | Tower of Power | Pizza Discount Offers |
| | Twitter | Add More Games | Add More Apps |
| | Me2day | | |
| Meeting | Samsung ChatOn | Add New Game | Add New App |
| | WhatsApp | | |
| | Twitter | | |
| | Add More Apps | | |

Table 2 is an example of a social application list of social applications mapped to device status information (e.g., phone status information). The application manager 530 may prepare a table of applications grouped based on the filter, wherein the applications are active during the corresponding mapped device status information. Also, the application manager 530 may enable the user to associate each device status information setting (e.g., phone status information setting) to an application sub-list. The application sub-list may include at least one application selected from the application list. For example, the filters used in the exemplary embodiment illustrated in Table 2 are a social application, a multi-user game, and a utility application. With respect to "General" device status information (such as phone status information), the social application sub-list includes Gmail Chat®, Facebook Chat®, Samsung ChatOn®, WhatsApp®, and Twitter®. Also, with respect to "General" device status information, the user added multi-user games and a utility application, such as Poker, Need for Speed®, and Stock Market. However, with respect to "Meeting" device status information, the user selected the social application sub-list including Samsung ChatOn®, WhatsApp®, and Twitter®, and did not select any multi-user game or utility application. Thus, application lists individually mapped to activation of certain device status information.

Table 2 merely provides an example of mapping applications. A specific application list associated with each device status information setting is not limited and may include a set of all applications of the electronic device.

The setting manager 525 may prepare Table 3 based on Table 2. Table 3 includes device status information (e.g., phone status information) to which an application list is mapped, and a setting associated with at least one application. Here, the application list denotes an application sub-list. The setting manager 525 enables the user to define a setting on the application list associated with each device status information setting (e.g., phone status information setting), and the setting is not limited to one of a status message of an application, connection, notification, vibration, a dot color, availability status, and alarm. The user may determine a connection of the application list during different device status information. Also, the setting manager 525 may enable the user to define a customized status message for each application in the application list. Moreover, the user may define a default status of each status information setting, and apply the default status to all applications associated with certain device status information. Further, the user may determine to immediately transmit a chat message during "Meeting" or "Silent" device status information. Still further, the user may list applications to which a chat message or a notice should not be transmitted during "Meeting" device status information. In this case, chat messages may be stored in a buffer memory, and may be transmitted to the user when device status information is changed to "General". Table 3 below shows customization of an application setting.

TABLE 3

| Device Status information | Social Application | Status Message | Connection | Notification | Alarm | Vibration |
|---|---|---|---|---|---|---|
| General | Gmail Chat | Available | Yes | Yes | Alert Tone1 | Yes |
| | Facebook Chat | Available | Yes | Yes | Alert Tone2 | No |
| | Samsung ChatOn | Available | Yes | Yes | Alert Tone3 | Yes |
| | WhatsApp | Available | Yes | Yes | Alert Tone4 | Yes |
| | Twitter | No Status | Yes | Yes | . . . | Yes |
| | 3D Home Run | Available | Yes | Yes | Alert Tone5 | No |
| | Stock Updates | | Yes | Yes | Alert Tone6 | No |
| | Phone Review | | Yes | Yes | Alert Tone7 | Yes |
| Meeting | Samsung ChatOn | Do Not Disturb | Yes | No | . . . | No |
| | WhatsApp | In Meeting | Yes | No | . . . | No |
| | Twitter | In Meeting!!! | Yes | No | . . . | No |
| | Me2day | I hate meetings | Yes | Yes | . . . | Yes |

Table 3 is an example of general device status information (e.g., phone status information) associated with an application list including Gmail Chat®, Facebook Chat®, Samsung ChatOn®, WhatsApp®, and Stock Updates®. Settings associated with an application may include a status message, connection, notification, alarm, or vibration, but are not limited thereto. For example, in "General" device status information, the user may set an application status to "Available", connection to "Yes", and notification to "Yes". Also, different alarm tones may be set to various applications in "General" device status information. In "Meeting" device status information, different customized status messages may be usable for each application with respect to applications selected based on Table 2. A status message "Do not disturb" is applied to an application Samsung ChatOn®, and "Yes" is assigned to connection and "No" is assigned to notification. On the other hand, a status message "I hate meetings" is applied to an application Me2 day® in meeting status information, and the user assigns "Yes" to connection and "Yes" to notification. In addition, the user may assign a default state to the meeting status information, and such a default status includes a status message "In meeting", connection "Yes", and notification "No". Thus, the setting is customized based on preference of the user that is defined in Table 3, with respect to each application in certain device status information. The status updater 520 uses Table 3 for an additional process.

Table 3 provides only an exemplary embodiment of mapping applications to device status information. Also, a setting, status, connection, notification, alarm, and vibration defined in Table 3 are not so limited. Also, an application list associated with each device status information setting is not limited and may include a list of all applications on the electronic device.

The setting manager 525 enables the user to select one of the plurality of device status information, maps at least one application to each device status information setting, provides a user interface (UI) for the user to select a setting on each application, and performs setting according to a selection by the user.

Functions of the setting manager 525 will be described in detail with reference to FIGS. 6 through 9B.

Figure 6:
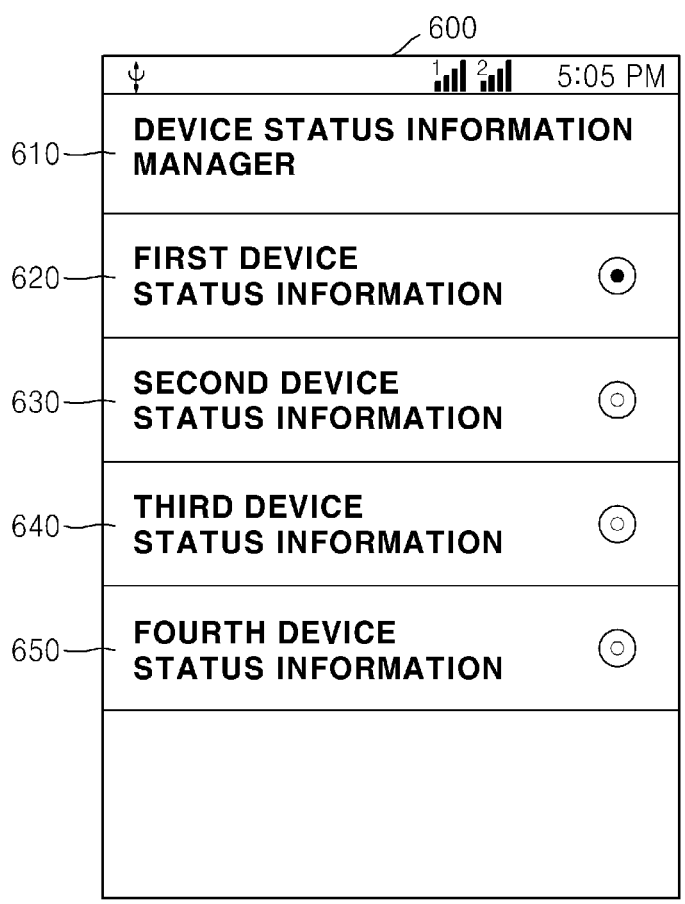
FIG. 6 illustrates a user interface (UI) window provided by a setting manager for a user to select one of a plurality of device status information settings, according to an exemplary embodiment.

FIG. 6 illustrates a UI window 600 provided by the setting manager 525 for a user to select one of a plurality of device status information settings (e.g., phone status information settings), according to an exemplary embodiment.

Referring to FIG. 6, the UI window 600 may include a menu 610 called a device status information manager, and examples of selectable device status information settings include first device status information 620 (e.g., first phone status information), second device status information 630 (e.g., second phone status information), third device status information 640 (e.g., third phone status information), and fourth device status information 650 (e.g., fourth phone status information). Device status information may be preset by default in an electronic device, or may be added by the user. For example, the user may add fifth device status information (e.g., fifth phone status information) that is new device status information to the UI window 600.

The user may select one of the plurality of device status information settings (e.g., phone status information settings) displayed on the UI window 600. In the exemplary embodiment illustrated in FIG. 6, the user selected the first device status information 620.

When one of the plurality of device status information settings is selected, the setting manager 525 may map at least one application to the selected device status information, and provide a UI window for a user to set a status message according to each mapped application.

Figure 7:
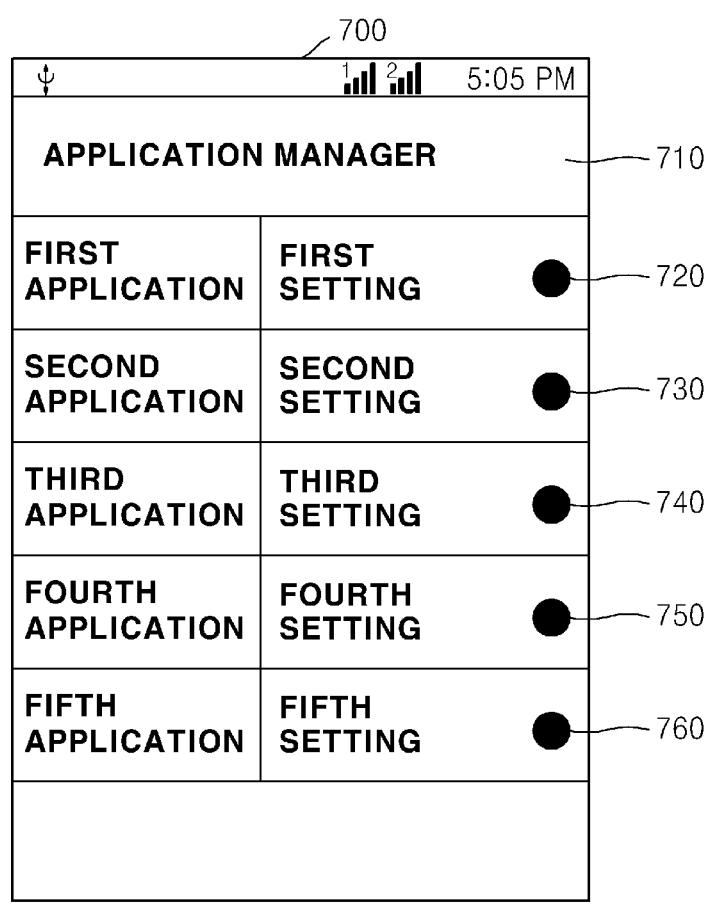
FIG. 7 illustrates a UI window provided for a user to map at least one application to each device status information and set a status message corresponding to the mapped application.

FIG. 7 illustrates a UI window 700 provided for a user to map at least one application to each device status information setting and set a status message corresponding to the mapped application.

Referring to FIG. 7, the UI window 700 includes a menu 710 called an application manager for selecting or adding an application to be mapped to certain device status information (e.g., phone status information). In the UI window 700 of FIG. 7, the user selected first through fifth applications 720 through 760 to be mapped to the certain device status information, and selects a setting to be used as application status information with respect to each application. In other words, a first setting is selected for the first application 720, a second setting is selected for the second application 730, a third setting is selected for the third application 740, a fourth setting is selected for the fourth application 750, and a fifth setting is selected for the fifth application 760. A setting corresponding to each application may show a desired status of an electronic device for the application mapped to the certain device status information, and as described above, a status message, connection, notification, alarm, and vibration may be set.

Figure 8A:
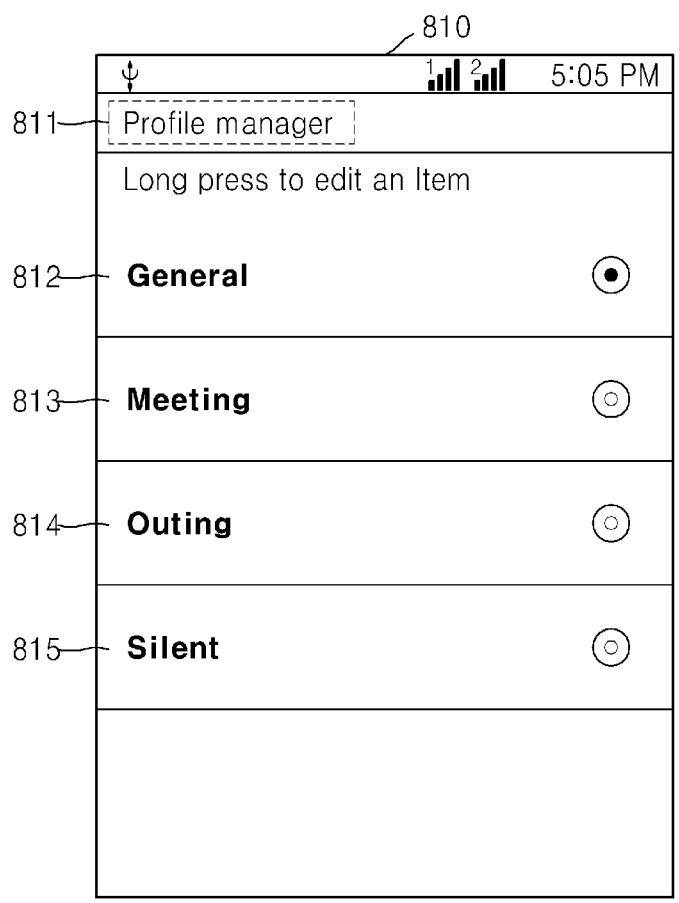
FIG. 8A illustrates a UI window provided by the setting manager for a user to select one of a plurality of device status information settings, according to an exemplary embodiment.

FIG. 8A illustrates a UI window 810 provided by the setting manager 525 for a user to select one of a plurality of device status information settings (e.g., phone status information settings), according to an exemplary embodiment.

Referring to FIG. 8A, the UI window 810 may include a menu 811 called a profile manager, and examples of a selectable phone profile, e.g., device status information settings (for example, phone status information settings), may include 'General' 812, 'Meeting' 813, 'Outing' 814, and 'Silent' 815. In an exemplary embodiment shown in FIG. 8A, a user selected 'General' 812 from among the plurality of device status information settings displayed on the UI window 810.

Figure 8B:
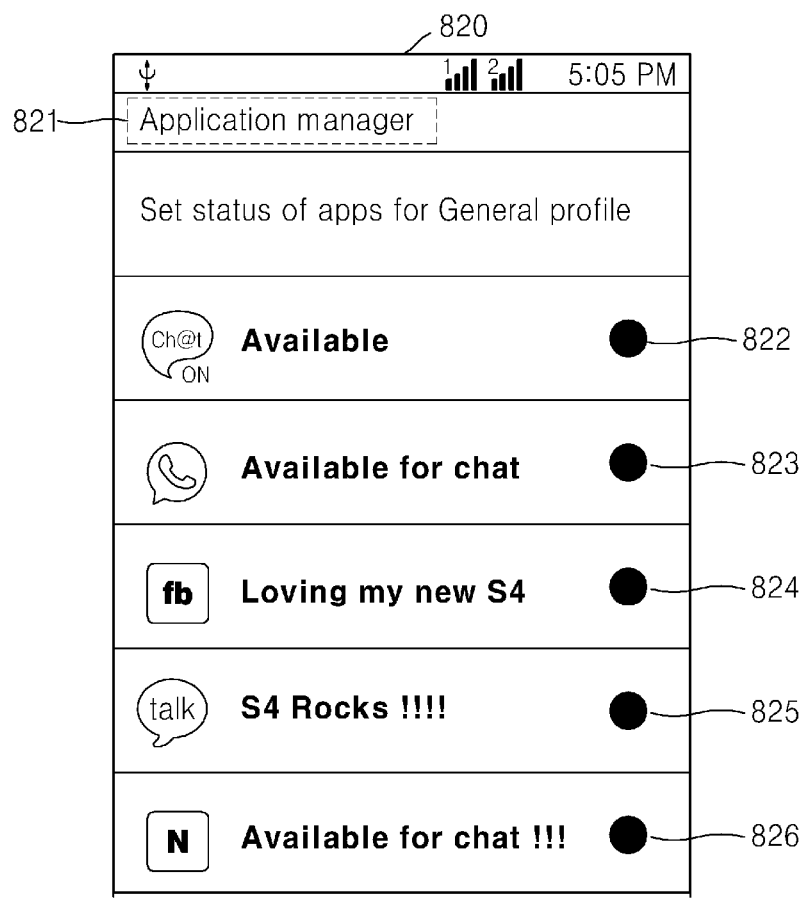
FIG. 8B illustrates a window prompted with respect to "General" device status information that is certain device status information selected in FIG. 8A such that the setting manager maps a plurality of applications to the "General" device status information and defines a status message with respect to at least one application, according to an exemplary embodiment.

FIG. 8B illustrates a window 820 prompted with respect to "General" device status information that is certain device status information (e.g., phone status information) selected in FIG. 8A such that the setting manager 525 maps a plurality of applications to the "General" device status information and defines a status message with respect to at least one application, according to an exemplary embodiment. The window 820 may include a menu 821 called an application manager.

Referring to FIG. 8B, an exemplary embodiment is shown in which a user selected ChatOn® 822, WhatsApp® 823, Facebook Messenger® 824, GTalk® 825, and Nimbuzz® 826 as applications mapped to "General" device status information. Also, the user set each status message to correspond to the application mapped to the "General" device status information. The status message is set to "Available" in ChatOn® 822, to "Available for chat" in WhatsApp® 823, to "Loving my new S4" in Facebook Messenger® 824, to "S4 Rocks" in GTalk® 825, and to "Available for chat" in Nimbuzz® 826. A dot besides each status message is in green to indicate that the user is able to chat.

Figure 9A:
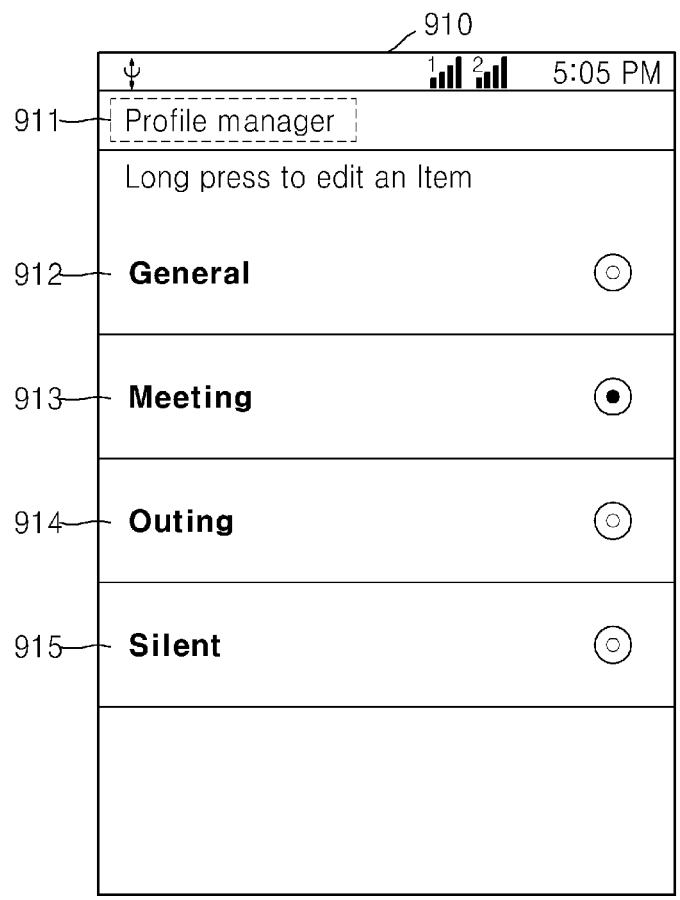
FIG. 9A illustrates a UI window provided by the setting manager for a user to select one of a plurality device status information settings, according to an exemplary embodiment.

FIG. 9A illustrates a UI window 910 provided by the setting manager 525 for a user to select one of a plurality of device status information settings (e.g., phone status information settings), according to an exemplary embodiment.

Referring to FIG. 9A, the UI window 910 may include a menu 911 called a profile manager, and examples of selectable device status information settings (e.g., phone status information settings) include 'General' 912, 'Meeting' 913, 'Outing' 914, and 'Silent' 915. In FIG. 9A the user selected 'Meeting' 913 from the plurality of device status information settings (e.g., phone status information settings) displayed on the UI window 910.

Figure 9B:
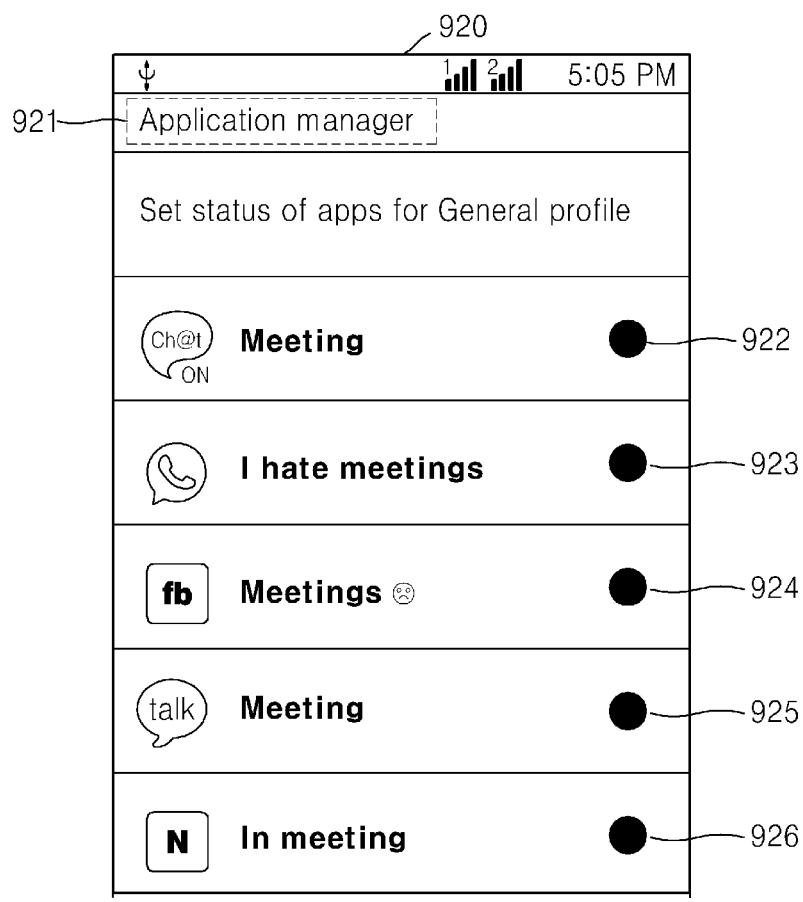
FIG. 9B illustrates a window prompted with respect to "Meeting" device status information that is certain device status information selected in FIG. 9A such that the setting manager maps a plurality of applications to the "Meeting" device status information and defines a status message with respect to at least one application, according to an exemplary embodiment.

FIG. 9B illustrates a window 920 prompted with respect to "Meeting" device status information that is certain device status information selected in FIG. 9A such that the setting manager 525 maps a plurality of applications to the "Meeting" device status information and defines a status message with respect to at least one application, according to an exemplary embodiment. The window 920 may include a menu 921 called an application manager.

Referring to FIG. 9B, the user selected ChatOn® 922, WhatsApp® 923, Facebook Messenger® 924, GTalk® 925, and Nimbuzz® 926 as applications mapped to the "Meeting" device status information. Also, the user may set a status message corresponding to each application mapped to the "Meeting" device status information. The status message may be set to "Meeting" in ChatOn® 922, to "I hate meetings" in WhatsApp® 923, to "Meetings" in Facebook Messenger® 924, to "Meeting" in GTalk® 925, and to "In meeting" in Nimbuzz® 926.

Accordingly, when device status information is changed from "General" device status information to "Meeting" device status information, each status of the plurality of applications may be updated automatically. For example, a dot besides each status message may be in red (not shown), indicating that the user is unable to chat.

Referring back to FIG. 5, the status updater 520 may fetch all settings and data by interacting with the application detector 535, the application manager 530, and the setting manager 525. Also, herein, an automatic status updater called the status updater 520 communicates with an application server to apply a setting customized to each application. The status updater 520 may fetch current device status information (e.g., current phone status information) from the device status information tracker 510, and may fetch an application list of applications mapped to the current device status information based on, for example, Table 2 above.

Also, the status updater 520 may determine whether the electronic device is connected to the Internet. A social application and a chat messenger are Internet-based applications, and settings thereof need to be changed only when the electronic device, such as a mobile phone, is connected to the Internet. When a change of the device status information is detected, the device status information tracker 510 may transmit current device status information to the status updater 520. Also, the application manager 530 may receive a notification corresponding to new device status information (e.g., new phone status information) from the device status information tracker 510, fetch an application list of applications mapped to the new device status information, and transmit the application list to the status updater 520.

Also, the status updater 520 may fetch settings corresponding to the plurality of applications from, for example, Table 3 above, connect to a plurality of application servers, and transmit the settings to the plurality of application servers. Then, the application servers may apply the settings to corresponding application based on the settings defined in, for example, Table 3.

With respect to a change in device status information, the status updater 520 may update application status information of the plurality of applications by automatically communicating with the application servers. If a setting of an application is not defined in, for example, Table 3, the status updater 520 may be linked to an automatic mode to apply a default setting to an application in new device status information. The application server may apply the default setting to the application. If an existing application is deleted or uninstalled, the application list may be updated accordingly. A setting about the deleted application may be stored in a backup memory. If the deleted application is later reinstalled in a communication device or another pairing device, the setting stored in the backup memory may be applied thereto.

The status updater 520 has three functional modes. The three functional modes include at least one of an automatic mode, a semi-automatic mode, and a manual mode.

In the automatic mode the user defines a setting only once. Also, the user may select not to define a setting with respect to an application, and at this time, a default setting may be applied to the applications in the application list. In the automatic mode, when device status information changes, settings of the applications in the application list may be updated automatically. An exemplary function in the automatic mode will now be described. In the automatic mode, a window enabling the user to customize a setting of each social application installed in a mobile phone may be presented to the user. Then, when the user switches device status information from first device status information (e.g., first phone status information) to second device status information (e.g., second phone status information), a setting is updated in an application sub-list associated with the second device status information. If the user does not want to define a setting on a new application detected as an Internet-based application, a default setting may be applied to the new application. Also, the user may classify the new application as at least one of a social network and a communication application, and define a setting corresponding to the new application for the plurality of device status information settings (e.g., phone status information settings).

In the semi-automatic mode, when the user switches device status information from the first device status information to the second device status information, the user may be given options described below, but the options are not limited thereto.

1. Apply a customized setting to all active applications mapped to second device status information based on, for example, a configuration as shown in Table 3.

2. Apply a default setting to all active applications mapped to second device status information.

3. Select an application whose setting is to be updated automatically, and apply a manual or default setting to remaining applications.

The user may select at least one of the options, and a setting of an application may be updated based on the selected option(s).

In the manual mode, when the user switches device status information (e.g., phone status information) from the first device status information (e.g., first phone status information) to the second device status information (e.g., second phone status information), the user may manually apply a setting on at least one application mapped to the second device status information.

Figure 10:
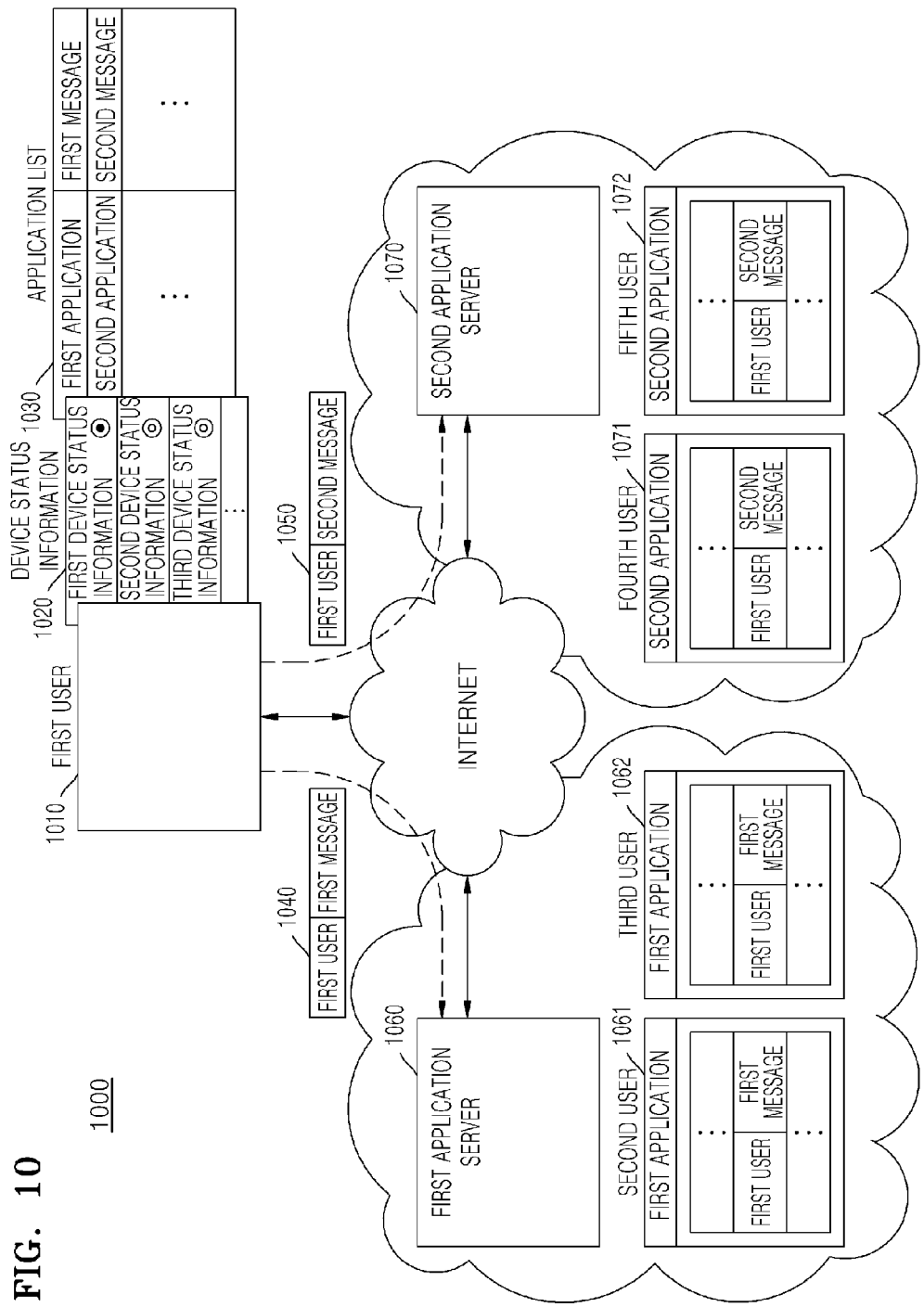
FIG. 10 is a diagram for describing a process of selecting device status information by a user, and showing a message set corresponding to an application mapped to the selected device status information to other users through a network, according to an exemplary embodiment.

FIG. 10 is a diagram illustrating a process of selecting device status information (e.g., phone status information) by a user, and showing a message set corresponding to an application mapped to the selected device status information (e.g., phone status information) to other users through a network, according to an exemplary embodiment.

Referring to FIG. 10, an environment 1000 includes a first user 1010, a first application server 1060, and a second application server 1070. In an electronic device of the first user 1010, first device status information (e.g., first phone status information) is selected from a plurality of device status information 1020, and an application list 1030 is mapped to the selected first device status information (e.g., first phone status information). The application list 1030 may include a first application and a second application, wherein a first message is set corresponding to the first application and a second message is set corresponding to the second application.

In order to reflect a setting status of the first user 1010, the electronic device of the first user 1010 may transmit information 1040 indicating the first user 1010 and that status information of the first user 1010 in the first application is the first message to the first application server 1060.

Then, a second user 1061 and a third user 1062 using the first application view that the first user 1010 is showing the first message through a corresponding window of the first application.

Similarly, the electronic device of the first user 1010 transmits information 1050 indicating the first user 1010 and that status information of the first user 1010 in the second application is the second message to the second application server 1070. Then, a fourth user 1071 and a fifth user 1072 using the second application view that the first user 1010 is showing the second message through a corresponding window of the second application.

Figure 11:
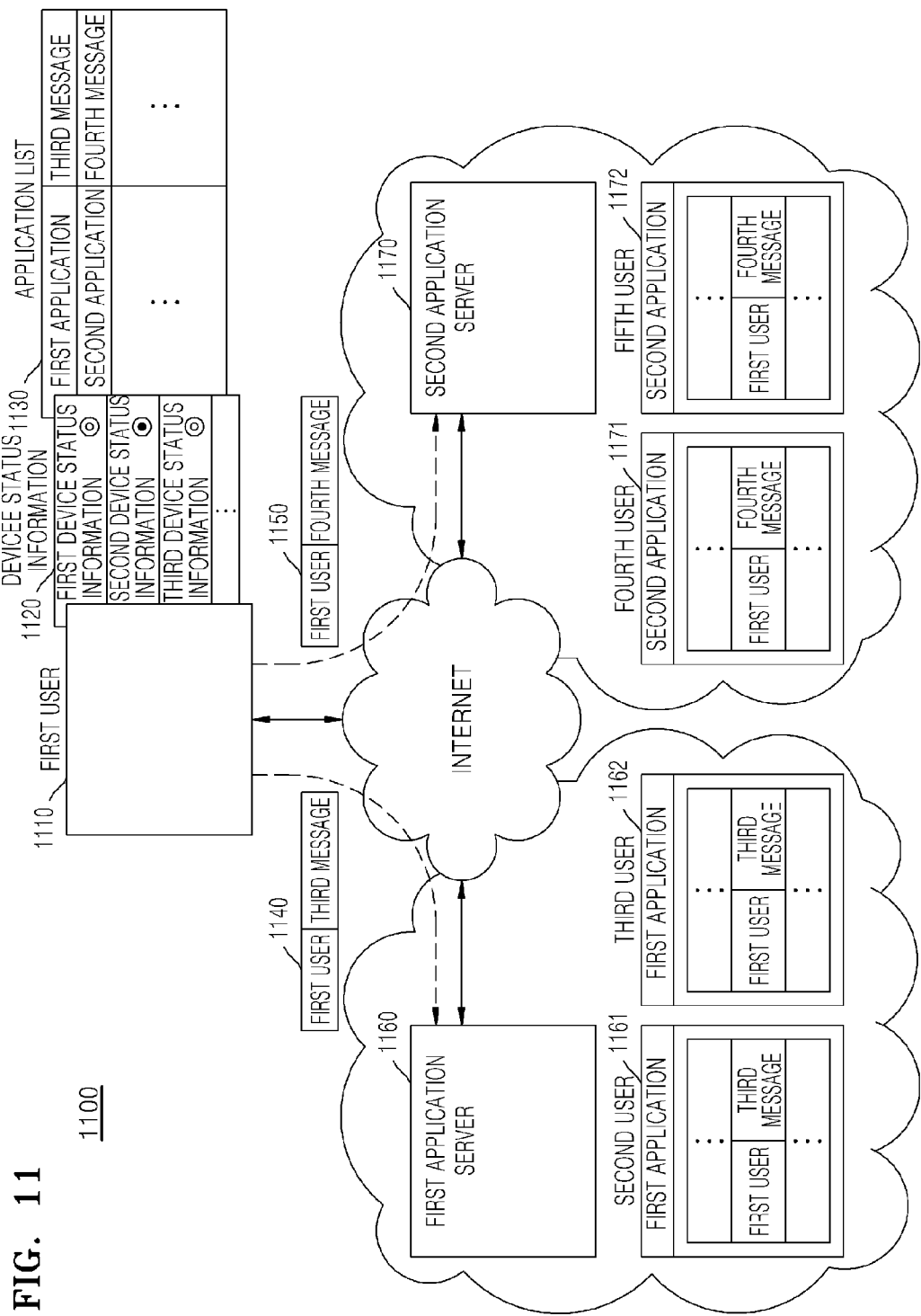
FIG. 11 is a diagram for describing a process of changing first device status information to second device status information from among a plurality of device status information settings by a user, and showing a message corresponding to an application mapped to the second device status information to other users through a network, according to an exemplary embodiment.

FIG. 11 is a diagram illustrating a process of changing first device status information (e.g., first phone status information) to second device status information (e.g., second phone status information) from among a plurality of device status information settings 1120 by a user, and showing a message set corresponding to an application mapped to the second device status information to other users through a network, according to an exemplary embodiment.

Referring to FIG. 11, an environment 1100 may include a first user 1110, a first application server 1160, and a second application server 1170. In an electronic device of the first user 1110, the first device status information (e.g., first phone status information) is changed to the second device status information (e.g., second phone status information) from the plurality of device status information settings 1120, and an application list 1130 is mapped to the second device status information. The application list 1130 includes a first application and a second application, wherein a third message is set corresponding to the first application and a fourth message is set corresponding to the second application.

In order to reflect a change of the device status information of the first user 1110, the electronic device of the first user 1110 transmits information 1140 indicating the first user 1010 and that status information of the first user 1110 in the first application is the third message to the first application server 1160.

Then, a second user 1161 and a third user 1162 using the first application view that the first user 1010 is showing the third message through a corresponding window of the first application.

Similarly, the electronic device of the first user 1110 may transmit information 1150 indicating the first user 1110 and that status information of the first user 1110 in the second application is the fourth message to the second application server 1170. Then, a fourth user 1171 and a fifth user 1172 using the second application view that the first user 1110 is showing the fourth message through a corresponding window of the second application.

Figure 12:
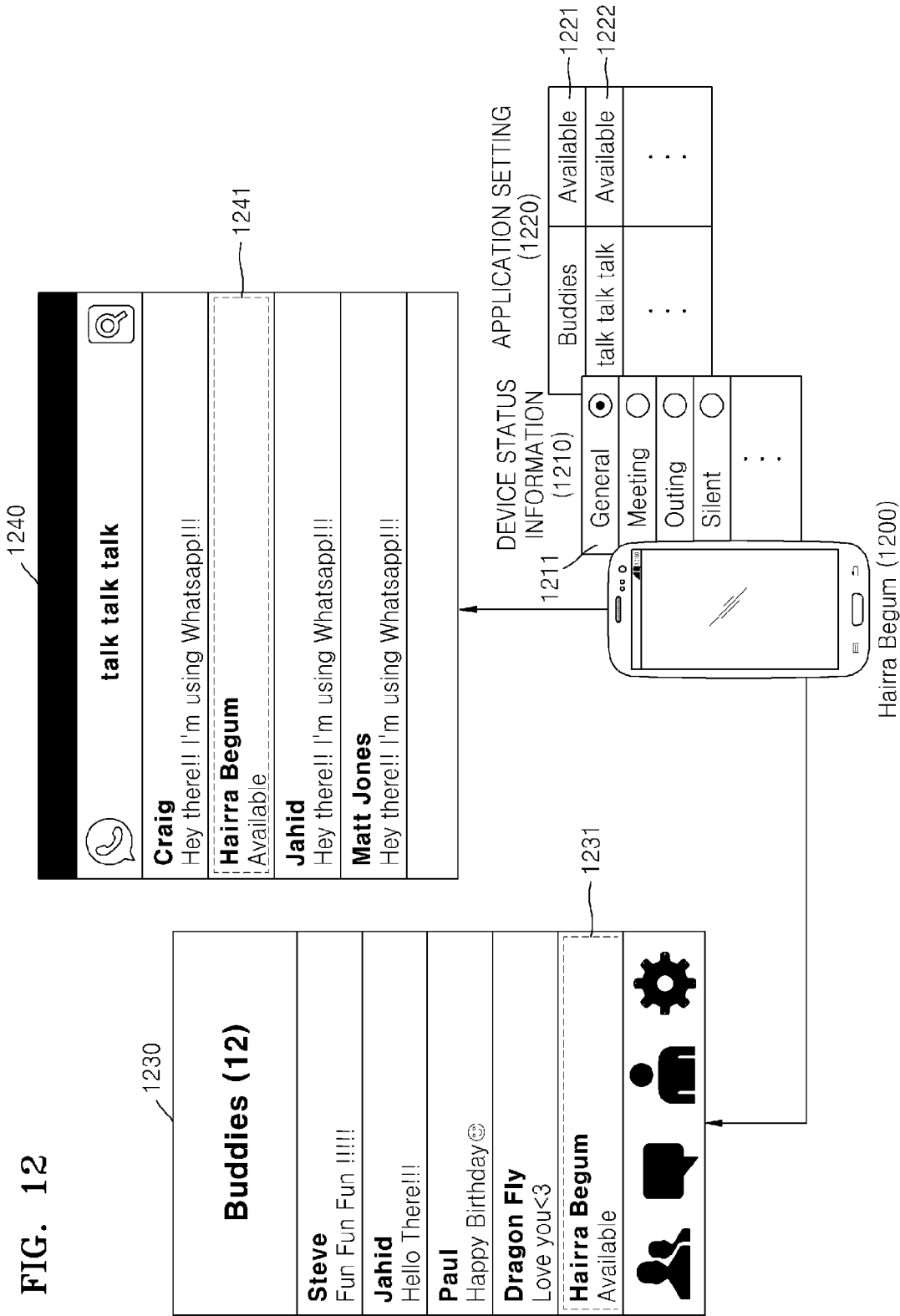
FIG. 12 illustrates a status message of Hairra Begum in a chat messenger application based on "General" device status information of Hairra Begum.

FIG. 12 illustrates a status message of a user, Hairra Begum, in a chat messenger application based on "General" device status information (e.g., phone status information) of Hairra Begum.

Referring to FIG. 12, on Hairra Begum's phone 1200, 'General' device status information 1211 is selected from a plurality of device status information settings 1210, and an application list 1220 mapped to the 'General' device status information includes applications called a Buddies application 1221 and an talk talk talk application 1222. "Available" is set as a status message to the Buddies application 1221, and "Available" is set as a status message to the talk talk talk application 1222.

In an exemplary embodiment, the status message of Hairra Begum is displayed as "Available" (1231) to other contacts 1230 of the Buddies application 1221, and the status message of Hairra Begum is displayed as "Available" (1241) to other contacts 1240 of the talk talk talk application 1222.

Figure 13:
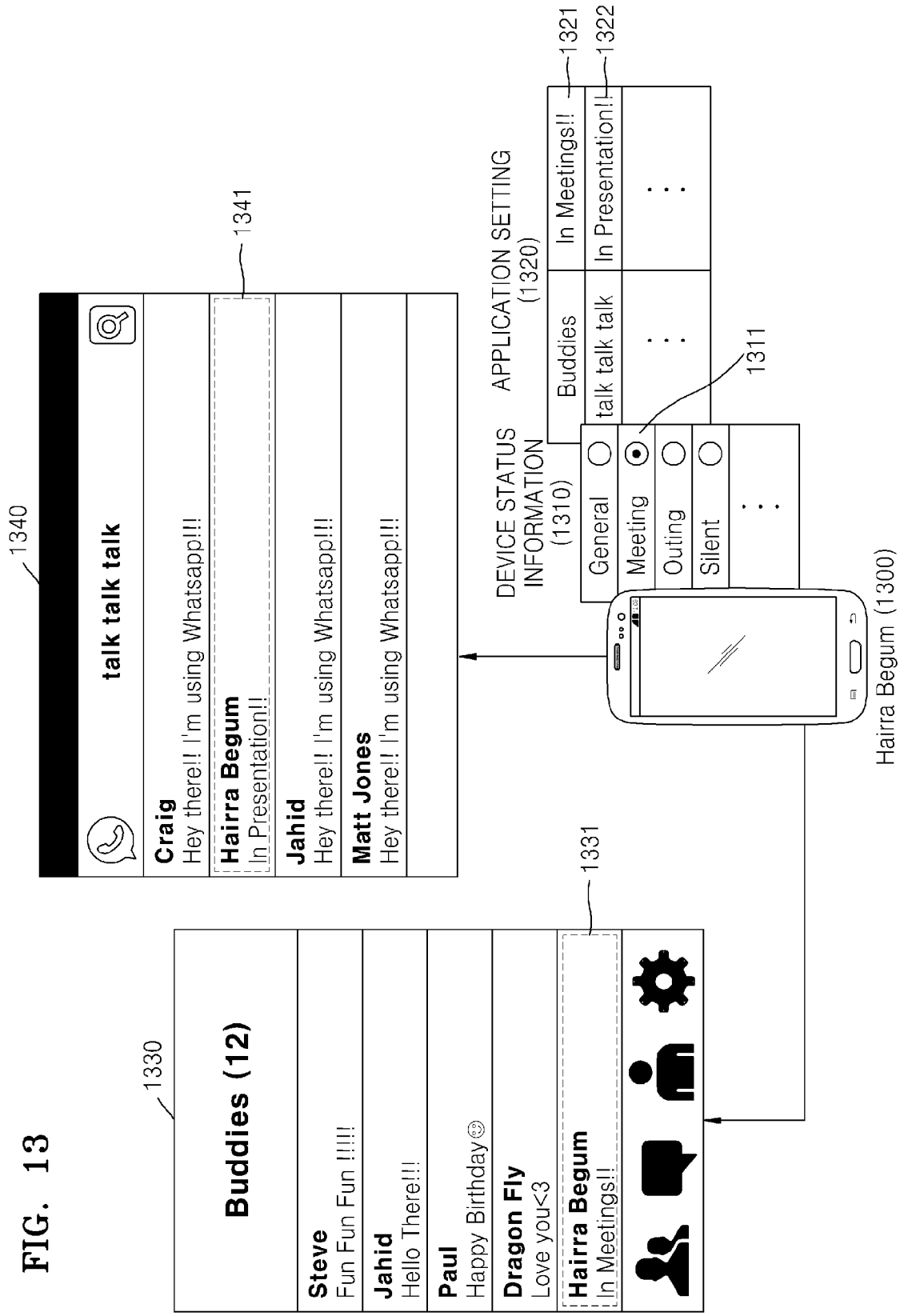
FIG. 13 illustrates a status message of Hairra Begum in a chat messenger application based on "Meeting" device status information of Hairra Begum.

FIG. 13 illustrates a status message of a user, Hairra Begum, in a chat messenger application based on "Meeting" device status information being selected for Hairra Begum.

Referring to FIG. 13, 'General' device status information is changed to 'Meeting' device status information 1311 from a plurality of device status information settings 1310 on Hairra Begum's phone 1300. An application list 1320 mapped to the 'Meeting' device status information includes applications called a Buddies application 1321 and a talk talk talk application 1322. A status message in the Buddies application 1321 is set to "In meetings!!", and a status message in the talk talk talk application 1322 is set to "In Presentation!!".

In an exemplary embodiment, according to the change of the device status information (e.g., phone status information) in the Hairra Begum's phone 1300, the status message of Hairra Begum automatically displays "In meetings!!" (1331) to other contacts 1330 of the Buddies application 1321, and the status message of Hairra Begum automatically displays "In Presentation!!" (1341) to other contacts 1340 of the talk talk talk application 1322. As such, the method may automatically apply a customized status of each application to any change of device status information.

According to an exemplary embodiment, the device status information module 505 and the synchronization module 515 may be included in an individual application, such as WhatsApp®, Gtalk®, Facebook Messenger®, or Nimbuzz®. For example, if a module is a part of an application, such as WhatsApp®, WhatsApp® may detect a change of device status information and then automatically set a status of a user. When device status information is changed from "General" to "Meeting", an application may detect the change and update a setting of the application according to the "Meeting" device status information.

Figure 14:
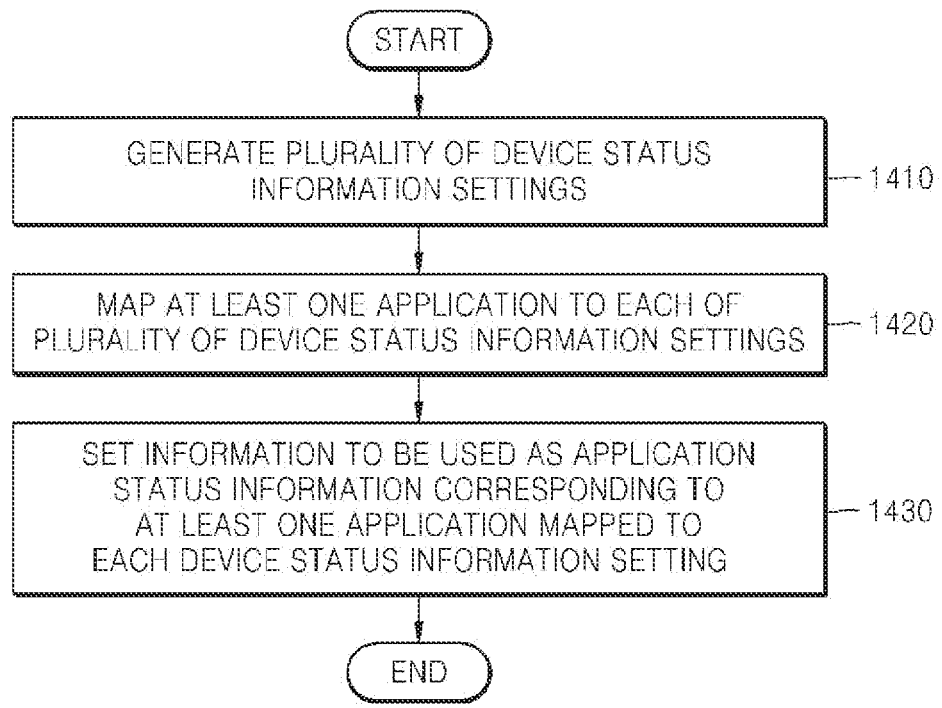
FIG. 14 is a flowchart of a method of generating application status information of an application, according to an exemplary embodiment.

FIG. 14 is a flowchart of a method of generating application status information, according to an exemplary embodiment.

Referring to FIG. 14, a plurality of device status information settings (e.g., phone status information settings) are generated in operation 1410. The plurality of device status information settings may be provided by default by an electronic device, or new device status information settings (e.g., new phone status information settings) may be added by a user.

In operation 1420, at least one application is mapped to each of the plurality of device status information settings. In other words, the electronic device may provide a UI window enabling the user to select or add an application to be mapped to each device status information setting, and may receive an input from the user to map and set the at least one application to each of the plurality of device status information settings.

In operation 1430, information to be used as application status information corresponding to the at least one application mapped to each device status information setting is set. The electronic device may provide a UI window enabling the user to select or input the information to be used as the application status information, and may receive an input from the user to perform setting according to each application. Here, examples of the information to be used as the application status information may include, for example, a status message, alarm, notification, and connection, but are not limited thereto.

As such, the electronic device may include the plurality of device status information settings and setting information of an application mapped to each device status information setting.

Figure 15:
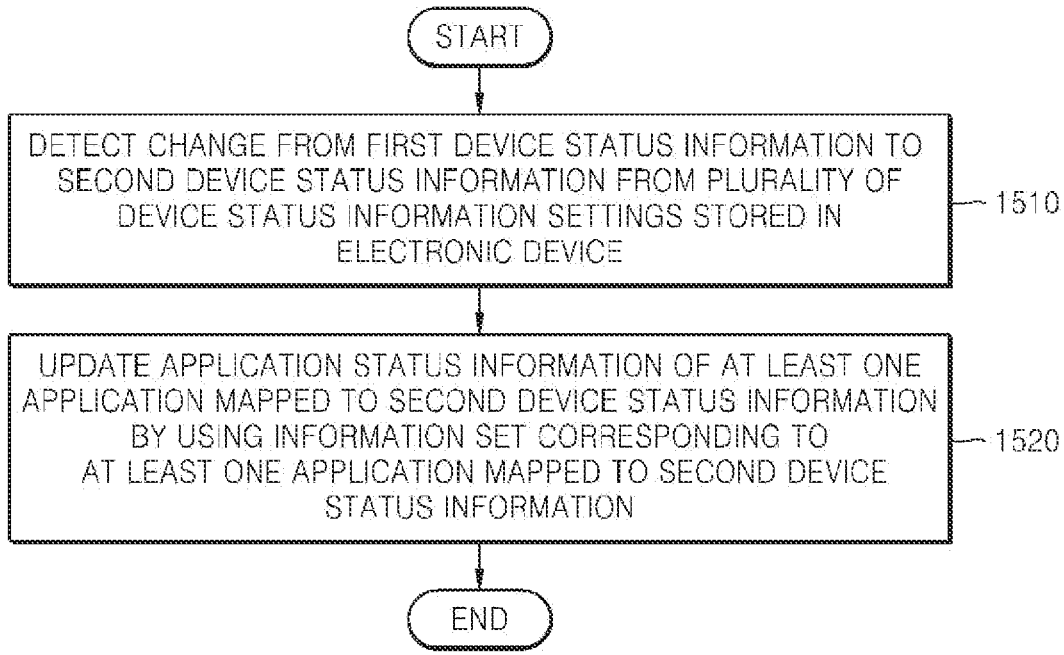
FIG. 15 is a flowchart of a method of changing application status information of an application according to a change of device status information of an electronic device, according to an exemplary embodiment.

FIG. 15 is a flowchart of a method of updating application status information according to a change of device status information (e.g., phone status information) of an electronic device, according to an exemplary embodiment.

Referring to FIG. 15, in operation 1510, a change from first device status information (e.g., first phone status information) to second device status information (e.g., second phone status information) from a plurality of device status information settings (e.g., phone status information settings) stored in the electronic device is detected.

In operation 1520, application status information of at least one application mapped to the second device status information is updated by using information corresponding to the at least one application mapped to the second device status information.

As such, since the application status information may be changed corresponding to the change of the device status information, the user may be saved from the trouble of modifying the application status information every time the user's environment changes.

Figure 16:
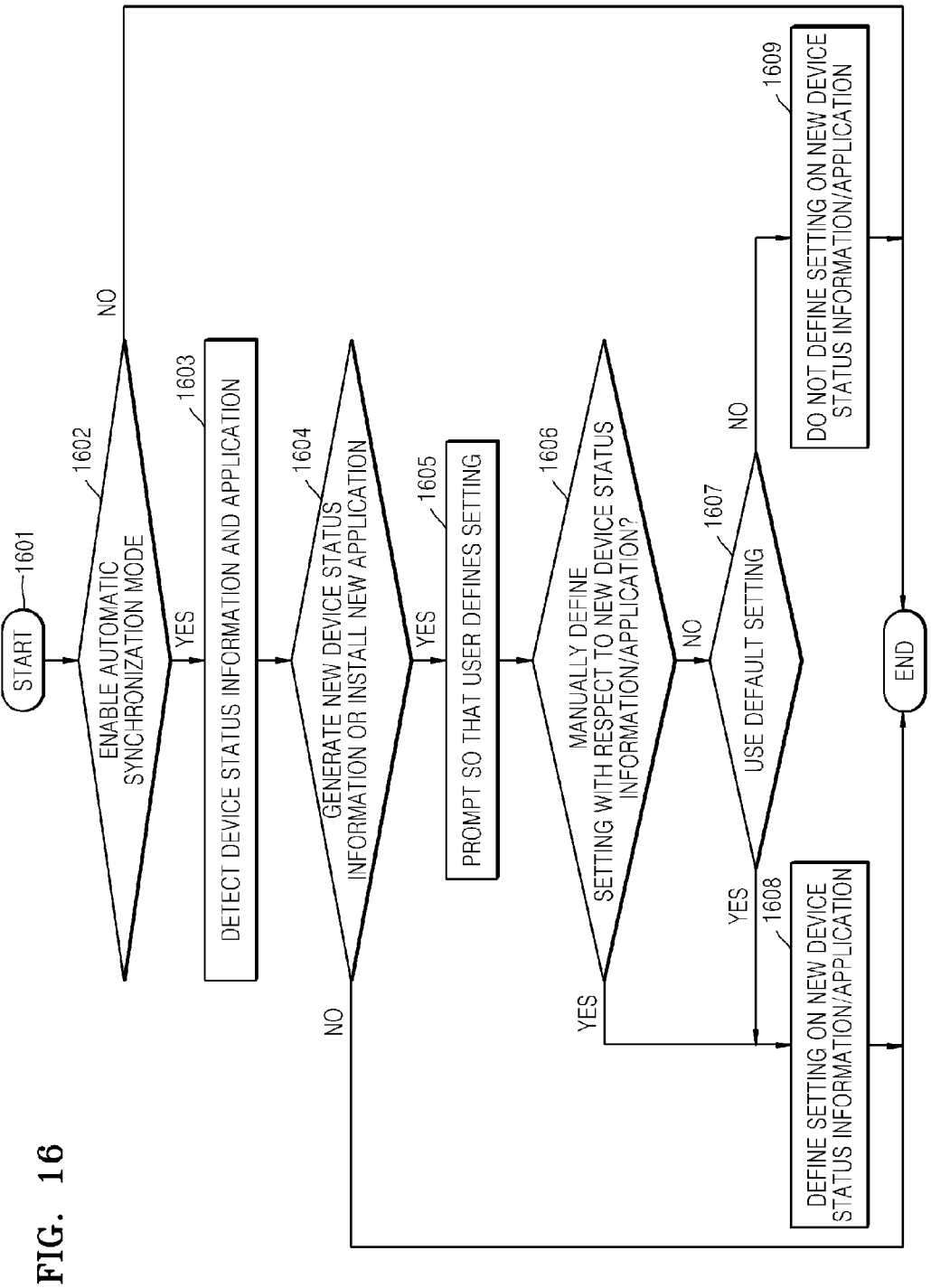
FIG. 16 is a flowchart of a method of applying a customized setting to new device status information and an unsynchronized application, according to an exemplary embodiment.

FIG. 16 is a flowchart of a method of applying a customized setting to new device status information (e.g., new phone status information) and an unsynchronized application, according to an exemplary embodiment. The method starts from operation 1601.

If an automatic synchronization mode is enabled in operation 1602, operation 1603 is performed, and if not, the method is ended. In the automatic synchronization mode, a change of device status information (e.g., phone status information) from a first profile to a second profile is detected, and all customized settings on applications are automatically applied to the second profile. If the automatic synchronization mode is enabled, a user does not have to perform any operation on each application.

In operation 1603, a device status information tracker detects currently active device status information, and an application detector detects different applications. Also, an application manager prepares lists of active applications and messengers associated with the currently active device status information.

In operation 1604, new device status information not in a list of all device status information is detected. Also, when the application detector detects a new application installed in an electronic device which is not listed in the application manager, a default setting may be applied to the new application in the automatic synchronization mode. If a new application and device status information are not detected, the method is ended.

In operation 1605, the user may be prompted and define settings on the new device status information and the new application through the application manager. Such newly defined settings are updated, as described with exemplary embodiments shown in Table 1 and Table 2 above, and are stored in a memory for future use.

In operation 1606, the user may manually define the settings on the new device status information and the new application. If the user associates the new application to the device status information, as described with respect to exemplary embodiments shown in Tables 1 and 2, operation 1608 is performed, and if not, operation 1607 is performed.

In operation 1607, the default setting on device status information is applied if operation 1606 is not performed. The default setting is defined with respect to each device status information including, for example, ringtone, status, and notification settings.

In operation 1608, the settings set in operation 1606 or 1607 are applied to each application. A method of defining a new setting with respect to a change of device status information is in a semi-automatic mode.

In operation 1609, if settings on the new application and device status information are not defined after operation 1607, the method is ended.

Figure 17:
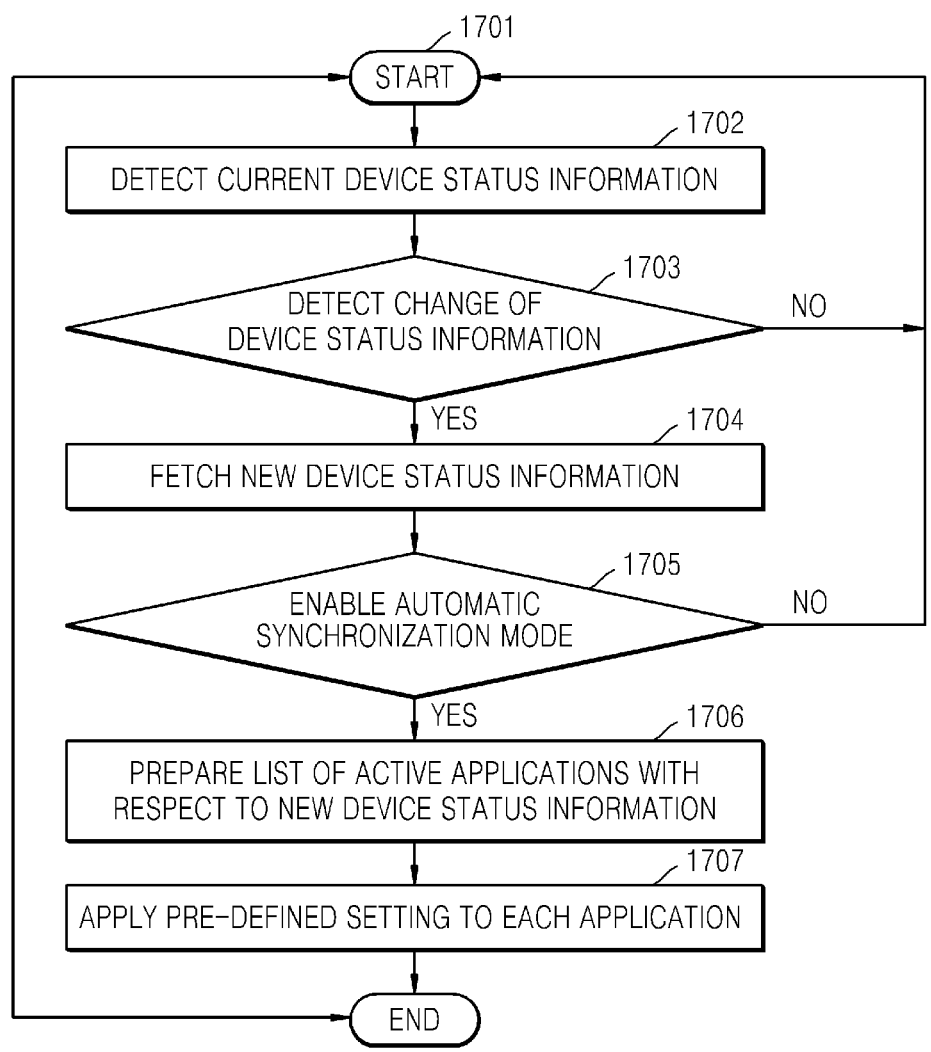
FIG. 17 is a flowchart of a method of automatically updating application status information of an application according to a change of device status information, according to an exemplary embodiment.

FIG. 17 is a flowchart of a method of automatically updating application status information according to a change of device status information (e.g., phone status information), according to an exemplary embodiment. The method starts from operation 1701.

In operation 1702, a device status information tracker detects current device status information (e.g., current phone status information). A customized setting of an application may be applied based on the current device status information.

In operation 1703, the device status information tracker detects a change of the current device status information to new device status information, for example, from 'General' device status information to 'Meeting' device status information. The device status information tracker may transmit the change to an application manager and a setting manager. If the change is detected, operation 1704 is performed and if not, operation 1701 is performed.

In operation 1704, the device status information tracker fetches new device status information, and may determine whether the new device status information is in a list of all device status information. If the new device status information is not in the list, a user may define a setting of the new device status information. If the new device status information is in the list, operation 1705 is performed.

In operation 1705, an automatic status updater determines whether an automatic synchronization mode is enabled. If the automatic synchronization mode is enabled, the new device status information may be mapped to an application list associated with the new device status information, and the operation 1706 is performed. If the automatic synchronization mode is not enabled, operation 1701 is performed.

In operation 1706, an application manager prepares lists of active applications and messengers associated with the new device status information. Also, the user may perform at least one of adding of an application and deleting of an application to and from the list through the application manager. Moreover, if the automatic synchronization mode is not enabled, the user may change an application list through the application manager. A mode in which the user is able to change a partial setting of an application during a change of device status information is referred to as a semi-automatic mode.

In operation 1707, a setting customized based on, for example, information corresponding to Table 2 is applied to each application. If the customized setting is not defined with respect to any application, a default setting associated with device status information may be applied. According to an exemplary embodiment, a new setting prepared during the semi-automatic mode is applied to an application. Then, operation 1701 is performed again, and thus the method is continuously performed in a loop.

As described above, according to one or more exemplary embodiments, a user may avoid interruption by an online contact if a phone profile or device status information (e.g., phone status information) is changed to "Silent". Here, a new status is automatically applied to all social applications. For example, contacts in social applications may be allowed to view that the user is at least in one of a meeting, a presentation, a party, and out so that the contacts know that the user is busy and is not to be disturbed. The user may apply different statuses and different settings of applications to at least one device status information setting (e.g., a phone status information setting). Accordingly, the user is able to automatically control online availability on an application.

The exemplary embodiments may also be embodied as computer-readable code on a computer-readable recording medium. The computer-readable recording medium is any data storage device that can store data which can be thereafter read by a computer system. Examples of the computer-readable recording medium include ROM, RAM, CD-ROMs, magnetic tapes, floppy disks, optical data storage devices, etc. The computer-readable recording medium can also be distributed over network-coupled computer systems so that the computer-readable code is stored and executed in a distributed fashion.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A method of updating application status information of an application in an electronic device, the method comprising:
   storing a plurality of device modes, wherein each of the plurality of device modes is mapped to at least one application among a plurality of applications, each of the at least one application mapped to each of the plurality of device modes has information on settings corresponding to the device mode, and the plurality of device modes include a first device mode and a second device mode;
   detecting a change from the first device mode to the second device mode from among the plurality of device modes;
   updating application status information of at least one application mapped to the second device mode by using the information on the settings corresponding to the second device mode,
   wherein the updating the application status information of at least one application comprises:
   transmitting, via a network, the information on the settings corresponding to the second device mode to an application server supporting the at least one application mapped to the second device mode.

2. The method of claim 1, wherein the detected change comprises receiving, from the user of the electronic device, a selection to change from the first device mode to the second device mode.

3. The method of claim 1, wherein the updating comprises:
   obtaining an application list of the at least one application mapped to the second device mode;
   obtaining information corresponding to the at least one application from the obtained application list; and
   updating application status information of the at least one application using the obtained information corresponding to the at least one application.

4. The method of claim 1, wherein the information corresponding to the at least one application comprises at least one of a status message, connectivity, notification, vibration, colors of dots, status of availability, and alarm of an application.

5. The method of claim 1, wherein the at least one application comprises a social network service application, and
   the updated application status information corresponding to an user of the electronic device is viewable to one or more users which access the application server using the application.

6. The method of claim 1, wherein the first device mode corresponds to a first phone mode and the second device mode corresponds to a second phone mode.

7. The method of claim 1, wherein the information on the settings which is transmitted to the application server, is applied to the at least one application mapped to the second device mode to update the application status information corresponding to a user of the electronic device.

8. A method of managing application status information of an application in an electronic device, the method comprising:
   generating a plurality of device modes including a first device mode and a second device mode;
   receiving a selection of at least one application to be mapped to each of the plurality of device modes;
   receiving information on the setting of the at least one application mapped to each of the plurality of device modes, and
   storing the plurality of device modes, and a plurality of received information on the settings corresponding to a plurality of selected applications in the electronic device,
   wherein in response to a change from the first device mode to the second device mode, the information on the setting of the at least one application mapped to the second device mode is used by an application server to be applied to the at least one application mapped to the second device mode to update application status information corresponding to a user of the electronic device.

9. The method of claim 8, wherein each of the plurality of device modes indicates one of a plurality of statuses corresponding to an environment of the user of the electronic device, and
   when a mapped device mode indicates one of the plurality of statuses corresponding to the environment of the user, the application status information of the at least one application indicates status information to be displayed in the application when the user is in the one of the plurality of statuses.

10. The method of claim 8, wherein the generating of the plurality of device modes comprises generating the plurality of device modes by the electronic device according to a default setting, or by receiving the plurality of device modes from a user.

11. The method of claim 8, wherein the generating of the plurality of device modes comprises:
    preparing a device mode list in the electronic device; and
    updating the device mode list based on at least one of a detecting new device mode and detecting an existing device mode.

12. The method of claim 8, wherein the receiving of the selection comprises:
    preparing an application list of applications which are active, corresponding to at least one of the plurality of device modes; and
    providing a user interface (UI) configured to permit at least one of adding an application to the application list and deleting an application from the application list.

13. The method of claim 8, wherein the first device mode corresponds to a first phone mode and the second device mode corresponds to a second phone mode.

14. An electronic device for updating application status information of an application, the electronic device comprising:
    a memory for storing instructions; and
    a processor connected to the memory, which executes the instructions to perform:
    storing a plurality of device modes, wherein each of the plurality of device modes is mapped to at least one application among a plurality of applications, each of the at least one application mapped to each of the plurality of device modes has information on settings corresponding to the device mode, and the plurality of device modes include a first device mode and a second device mode,
    detecting a change from the first device mode to the second device mode from among a plurality of device modes stored in the electronic device, updating application status information of at least one application mapped to the second device mode by using the information on the settings corresponding to the second device mode, wherein the updating the application status information of at least one application comprises:

transmitting, via a network, the information on the settings corresponding to the second device mode to an application server supporting the at least one application mapped to the second device mode.

15. The electronic device of claim 14, wherein the processor further executes instructions to perform, receiving, from the user of the electronic device, a selection to change from the first device mode to the second device mode.

16. The electronic device of claim 14, wherein the processor, further executes the instructions to perform, obtaining an application list of the at least one application mapped to the second device mode, obtaining information corresponding to the at least one application from the obtained list, and communicating with a server of the at least one application to update application status information of the at least one application by using the obtained information corresponding to the at least one application.

17. The electronic device of claim 14, wherein the information corresponding to the at least one application comprises at least one of a status message, connectivity, notification, vibration, colors of dots, status of availability, and alarm of an application.

18. The electronic device of claim 14, wherein the at least one application comprises a social network service application, and the updated application status information corresponding to an user of the electronic device is viewable to one or more users which access the application sever using the application.

19. The electronic device of claim 14, wherein the first device mode corresponds to a first phone mode and the second device mode corresponds to a second phone mode.

20. An electronic device for managing application status information of an application, the electronic device comprising:

a memory for storing instructions; and a processor connected to the memory, which executes the instructions to perform:

generating a plurality of device modes including a first device mode and a second device mode, receiving a selection of at least one application to be mapped to each of the plurality of device modes, receiving information on the settings of the at least one application mapped to each of the plurality of device modes, storing a plurality of device modes, and a plurality of received information on the settings corresponding to a plurality of selected applications in the electronic device, wherein in response to a change from the first device mode to the second device mode, the information on the settings of the at least one application mapped to the second device mode is used by an application server to be applied to the at least one application mapped to the second device mode to update application status information corresponding to a user of the electronic device.

21. The electronic device of claim 20, wherein each of the plurality of device modes indicates one of a plurality of statuses corresponding to an environment of the user of the electronic device, and when a mapped device mode indicates one of the plurality of statuses corresponding to the environment of the user, the application status information of the at least one application indicates status information to be displayed in the application when the user is in the one of the plurality of statuses.

22. The electronic device of claim 20, wherein the processor further executes instructions to perform, generating the plurality of device modes according to a default setting, or receiving the plurality of device modes from a user.

23. The electronic device of claim 20, wherein the processor further executes instructions to perform generating the plurality of device modes, preparing a device mode list in the electronic device, and updating the device mode list based on at least one of detecting a new device mode and detecting an existing device mode.

24. The electronic device of claim 20, wherein the processor further executes instructions to perform preparing an application list of applications active with respect to at least one of the plurality of device modes when the selection on the at least one application is received, and providing a user interface (UI) configured to permit at least one of adding an application to the application list and deleting an application from the application list.

25. The electronic device of claim 20, wherein the first device mode corresponds to a first phone mode and the second device mode corresponds to a second phone mode.

26. A non-transitory computer-readable recording medium having recorded thereon a program for executing a method of updating application status information of an application in an electronic device, the method comprising:

storing a plurality of device modes, wherein each of the plurality of device modes is mapped to at least one application among a plurality of applications, each of the at least one application mapped to each of the plurality of device modes has information on settings corresponding to the device mode, and the plurality of device modes include a first device mode and a second device mode;

detecting a change from the first device mode to the second device mode from among the plurality of device modes stored in the electronic device;

updating application status information of at least one application mapped to the second device mode by using the information on the settings corresponding to the second device mode;

wherein the updating the application status information of at least one application comprises:

transmitting, via a network, the information on the settings corresponding to the second device mode to an application server supporting the at least one application mapped to the second device mode.

27. The non-transitory computer-readable recording medium of claim 26, wherein the first device mode corresponds to a first phone mode and the second device mode corresponds to a second phone mode.

* * * * *